US010782960B2

(12) United States Patent  
Studer et al.

(10) Patent No.: US 10,782,960 B2  
(45) Date of Patent: Sep. 22, 2020

(54) USER INTERFACE THAT INTEGRATES PLURAL CLIENT PORTALS IN PLURAL USER INTERFACE PORTIONS THROUGH SHARING OF ONE OR MORE LOG RECORDS

(71) Applicant: Ab Initio Technology LLC, Lexington, MA (US)

(72) Inventors: Scott Studer, Georgetown, MA (US); Joel Gould, Arlington, MA (US); Amit Weisman, Bedford, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 15/917,182

(22) Filed: Mar. 9, 2018

(65) Prior Publication Data

US 2018/0349134 A1 Dec. 6, 2018

Related U.S. Application Data

(60) Provisional application No. 62/515,845, filed on Jun. 6, 2017.

(51) Int. Cl.
*G06F 8/71* (2018.01)
*G06F 11/36* (2006.01)
(Continued)

(52) U.S. Cl.
CPC .................. *G06F 8/71* (2013.01); *G06F 8/34* (2013.01); *G06F 9/451* (2018.02); *G06F 11/368* (2013.01);
(Continued)

(58) Field of Classification Search
None
See application file for complete search history.

(56) References Cited

U.S. PATENT DOCUMENTS 7,945,589 B1 * 5/2011 Weiss .................. G06F 8/71  
                                          707/795  
8,069,129 B2 * 11/2011 Gould .................. G06F 8/10  
                                          706/47

(Continued)

FOREIGN PATENT DOCUMENTS

WO      2008/124319      10/2008

OTHER PUBLICATIONS

Arsanjani, Ali. "Rule object 2001: A pattern language for adaptive and scalable business rule construction." Proc. of the 8th Conference on Pattern Languages of Programs (PLoP). 2001. (Year: 2001).*

(Continued)

*Primary Examiner* — Matthew J Brophy  
(74) *Attorney, Agent, or Firm* — Fish & Richardson P.C.

(57) ABSTRACT

A computer-implemented method for integrating client portals of underlying data processing applications through a shared log record, including: storing one or more log records that are each shared by the process management application and the version control application; receiving instructions through a user interface that integrates, through the shared one or more log records, the process management client portal with the version control client portal; in response to the receiving of the instructions, executing the received instructions, the executing of the received instructions including: selecting, by the version control application, a particular version of the rule from the multiple versions of the rule stored in the system storage; and transitioning, by the process management application, the particular version of the rule from the first state of the plurality of states to the second, different state of the plurality of states.

39 Claims, 16 Drawing Sheets

(51) Int. Cl.
  *G06F 9/451* (2018.01)
  *G06F 8/34* (2018.01)
  *G06F 17/40* (2006.01)
  *G06F 11/34* (2006.01)
  *G06F 9/448* (2018.01)
  *G06F 8/30* (2018.01)

(52) U.S. Cl.
  CPC ............... *G06F 17/40* (2013.01); *G06F 8/30* (2013.01); *G06F 9/4494* (2018.02); *G06F 11/3476* (2013.01); *G06F 11/3664* (2013.01)

(56) References Cited

U.S. PATENT DOCUMENTS

| | | | | |
|---|---|---|---|---|
| 8,667,017 | B1* | 3/2014 | Forney | G06Q 50/06 707/782 |
| 9,323,513 | B2* | 4/2016 | Pillay | G06F 8/60 |
| 9,606,903 | B2* | 3/2017 | Murugesan | G06F 11/3688 |
| 9,886,244 | B2* | 2/2018 | Paternostro | G06F 8/35 |
| 9,898,269 | B2* | 2/2018 | Pillay | G06F 8/60 |
| 2002/0120917 | A1* | 8/2002 | Abrari | G06F 8/10 717/110 |
| 2005/0125794 | A1 | 6/2005 | De Groot et al. | |
| 2006/0143220 | A1* | 6/2006 | Spencer, Jr. | G06F 8/20 |
| 2006/0293934 | A1* | 12/2006 | Tsyganskiy | G06F 8/72 705/7.29 |
| 2007/0185721 | A1* | 8/2007 | Agassi | G06Q 10/06 705/1.1 |
| 2008/0256014 | A1* | 10/2008 | Gould | G06F 8/10 706/48 |
| 2009/0007061 | A1* | 1/2009 | Ben-Zvi | G06F 8/10 717/105 |
| 2009/0083711 | A1* | 3/2009 | Singh | G06F 8/71 717/121 |
| 2009/0158272 | A1* | 6/2009 | El-Assir | G06F 8/61 717/177 |
| 2009/0282042 | A1* | 11/2009 | Russell | G06F 8/71 |
| 2011/0264754 | A1* | 10/2011 | Gidugu | G06F 8/36 709/206 |
| 2013/0246996 | A1* | 9/2013 | Duggal | G06F 8/35 717/104 |
| 2013/0283146 | A1* | 10/2013 | Barak | G06F 16/958 715/234 |
| 2015/0248280 | A1* | 9/2015 | Pillay | G06F 8/60 717/106 |
| 2015/0293764 | A1* | 10/2015 | Visvanathan | G06F 8/36 717/102 |
| 2015/0309772 | A1* | 10/2015 | Duggal | G06F 8/35 717/104 |
| 2015/0356001 | A1* | 12/2015 | Murugesan | G06F 11/3688 717/124 |
| 2016/0077820 | A1* | 3/2016 | Bergen | G06F 8/61 717/103 |
| 2016/0139916 | A1* | 5/2016 | Pillay | G06F 8/60 717/122 |

OTHER PUBLICATIONS

Bajec, Marko, and Marjan Krisper. "A methodology and tool support for managing business rules in organisations." Information Systems 30.6 (2005): 423-443. (Year: 2005).*

Cook, Steve, et al. Domain-specific development with visual studio dsl tools. Pearson Education, 2007. (Year: 2007).*

Gichahi, Henry Kamau. Rule-based Process Support for Enterprise Information Portal. Diss. Master Thesis, Feb. 2003. (Year: 2003).*

International Search Report and Written Opinion issued in PCT/US2018/036354, dated Nov. 26, 2018.

International Preliminary Report on Patentability in International Appln. No. PCT/US2018/036354, dated Dec. 10, 2019, 13 pages.

* cited by examiner

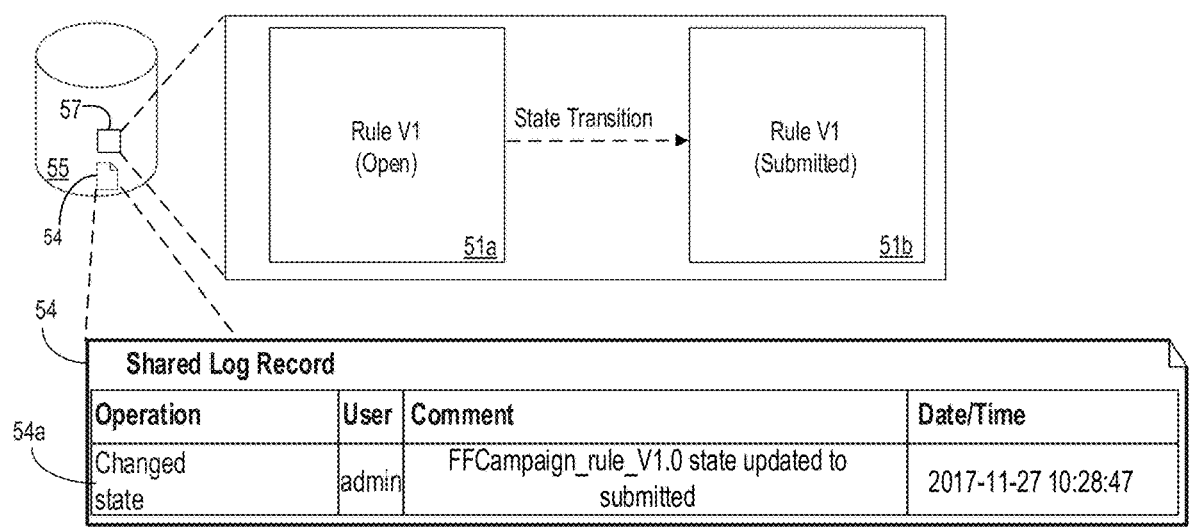
FIG. 3 (Con't)

60 ⬈

Integrated User Interface

Version Control Tool
62

63 {
| Version | Name |
|---|---|
| 2.0 ▾ | FFCampaign_rule_V2.0 |

63a — [ Open ] 63d — 63b  [ Save as new version ] 63c

Business Process Management Tool

See FIG. 3

52

Editor Tool and Simulator Tool

| Total frequent Flyer miles | Current year frequent flyer miles | Class of seat | Row of seat | Boarding Group |
|---|---|---|---|---|
| >= 1,000,000 | | | | 1 |
| | | first | | 1 |
| 64b >= 200,000 | >= last year frequent flyer miles | | | 2 |
| | | business | | 2 |
| | | else | <= 10 | 2 |
| | | same | <= 40 | 3 |
| | | same | <= 50 | 4 |
| | | same | else | 5 |

64a

64b [ Save ]    64c [ Simulate ]

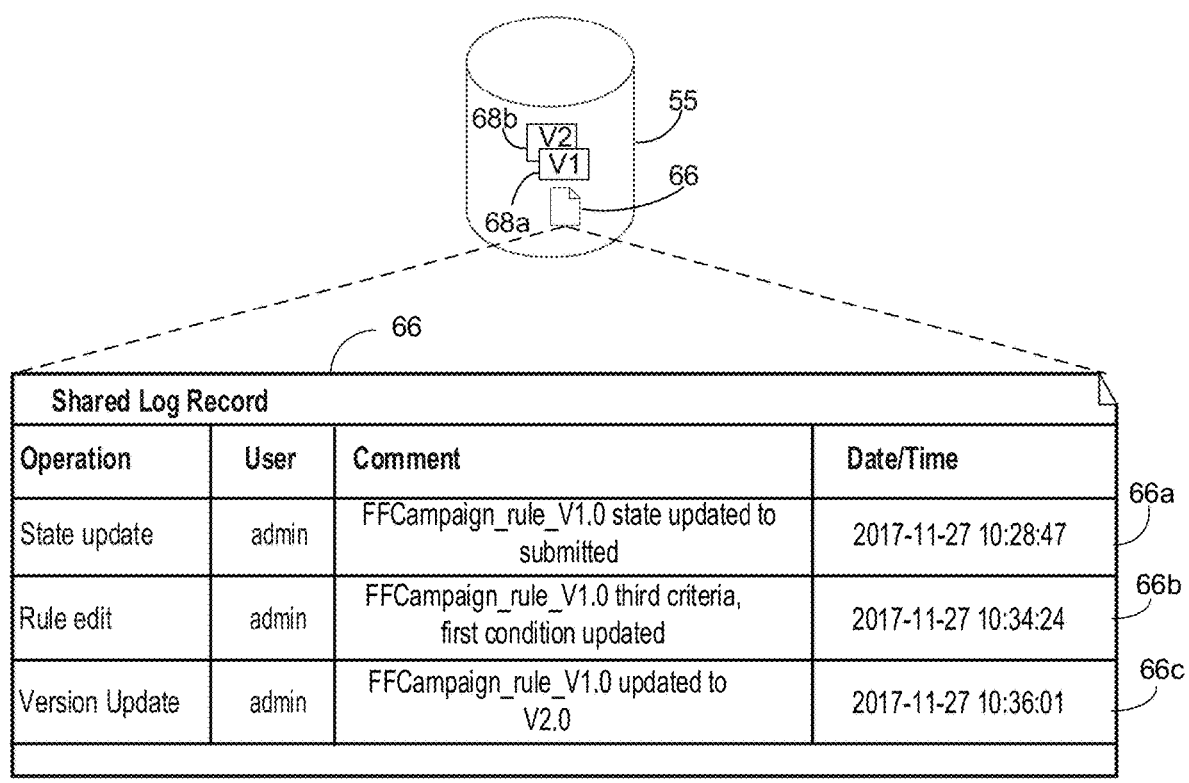
FIG. 4 (Con't)

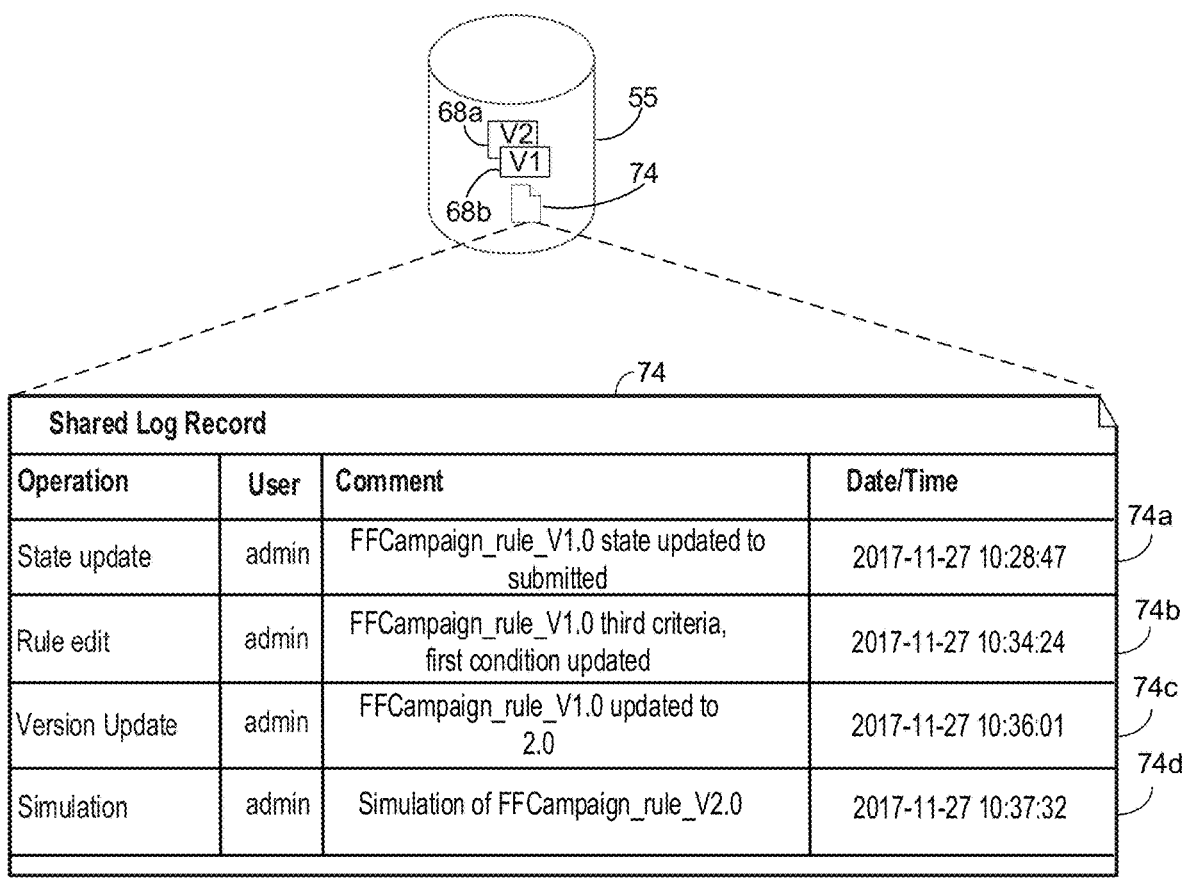
FIG. 5 (con't)

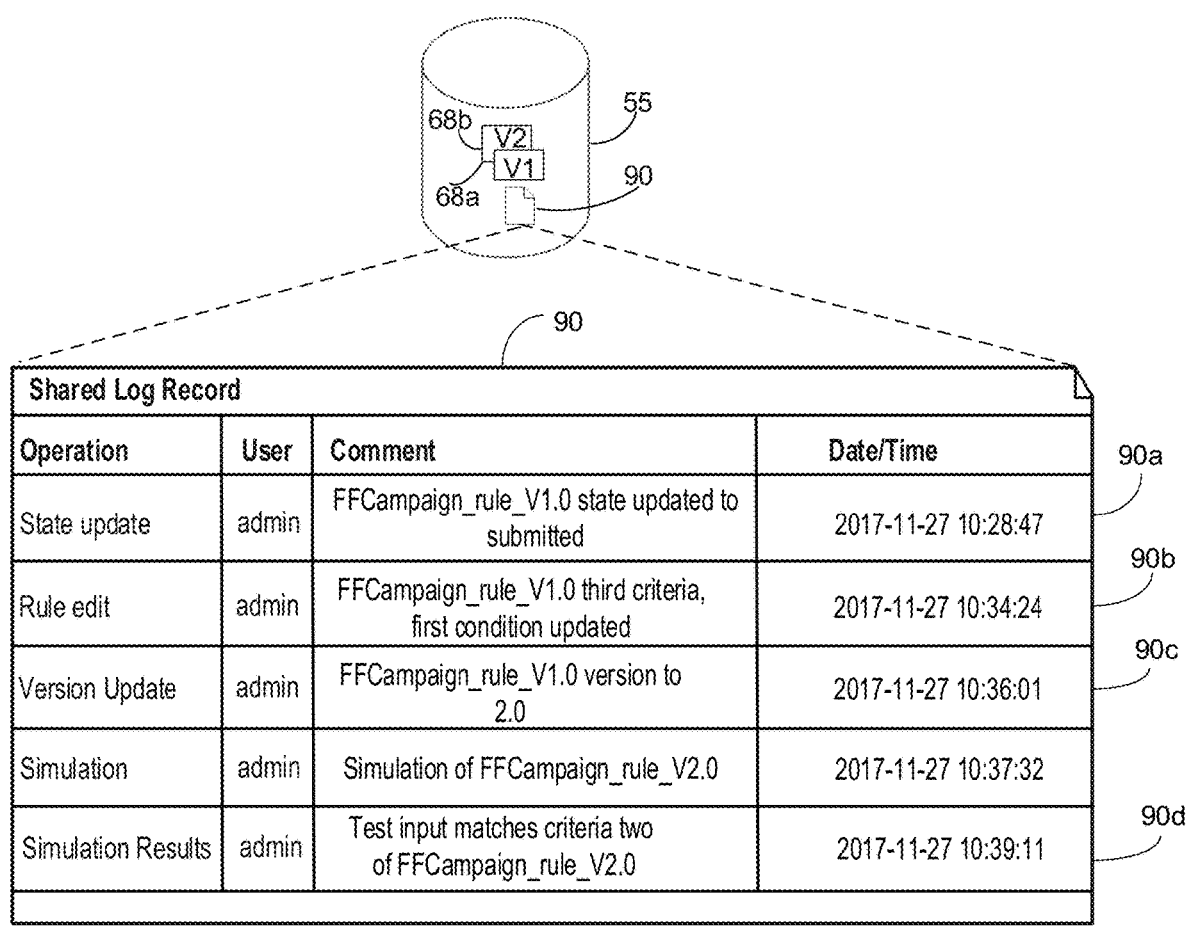
FIG. 6 (con't)

190

| | First State 192e (Dennis Developer Creates Ruleset) | Second State 192j (Mary Manager Tests) | Third State 192o (Sally Senior Manager Tests and Submits for Production) | Fourth state 192t (Ruleset in Production) |
|---|---|---|---|---|
| Editor 192a | ✓ 192f | 192k | 192p | 192u |
| Version Control 192b | ✓ 192g | 192l | 192q | 192v |
| BPM 192c | Open 192h | ✓ Reviewed 192m | ✓ Submitted 192r | Production 192w |
| Simulator 192d | ✓ 192i | ✓ 192n | ✓ 192s | 192x |

FIG. 9B

| | State | Name |
|---|---|---|
| | 1.0 Approved | CEP_release_V1.0 |
| | 1.1 Open | CEP_release_V1.1 |

202 204

| | Name | | State |
|---|---|---|---|
| | Investigate_Customer_Activity_V1.1 | 1.1 | Submitted |
| | Transaction_Classification_V1.1 | 1.1 | Submitted |
| | Review_Phone_Activity_V1.1 | 1.1 | Submitted |
| | Review_Posted_Monetary_Activity_V1.1 | 1.1 | Submitted |
| | Review_Web_Activity_V1.0 | 1.0 | Approved |
| | Review_Non_Monetary_Activity_V1.0 | 1.0 | Approved |

USER INTERFACE THAT INTEGRATES PLURAL CLIENT PORTALS IN PLURAL USER INTERFACE PORTIONS THROUGH SHARING OF ONE OR MORE LOG RECORDS

CROSS-REFERENCE TO RELATED APPLICATION

This application claims priority to U.S. provisional patent application 62/515,845, filed on Jun. 6, 2017, the entire contents of which are hereby incorporated by reference.

TECHNICAL FIELD

The present application relates to computer-implemented methods, systems and computer-readable media for integrating client portals of underlying data processing applications through a shared log record and for managing one or more rulesets across computer programs, which is especially beneficial in networked environments.

BACKGROUND

The description relates to an integrated system for editing, simulation, version control, and process management of rules, decision charts, and application configuration files.

A conventional ruleset version control tool allows a team of software programmers to manage the source code of several rulesets as the rulesets are developed and updated. The version control tool maintains a central repository of the rulesets. A software programmer may check out a ruleset, use a rule editor to edit the ruleset, and store the ruleset locally on the programmer's computer. When the ruleset is checked out, the ruleset is locked and cannot be edited by another programmer. After the programmer finishes editing the ruleset, the programmer may use a rule simulator to simulate execution of the ruleset by applying the ruleset to test data. When the programmer is satisfied with the changes to the ruleset, the programmer checks in the ruleset.

SUMMARY

Described herein is a data processing system for integrating client portals of underlying data processing applications through a shared log record and for managing one or more rulesets across computer programs.

In a general aspect 1, described is a computer-implemented method for implementing one or more rules for use with a process application and a version control application in a data processing system, with the process application being accessed by a process client portal and the version control application being accessed by a version control client portal, the method including: storing multiple versions of a rule in a system storage, in which the rule includes one or more rule cases that specify one or more values for the rule's output depending on the rule's input, and each rule case includes one or more input relationships in which the rule case is triggered by a given input record if one or more data values of the given input record meet the one or more input relationships; wherein each version of the rule is configured to be associated with a plurality of states including a first state and a second, different state of the plurality of states; storing one or more log records that are each shared by the process application and the version control application; receiving instructions through a user interface that integrates, through the shared one or more log records, the process client portal with the version control client portal, with the process client portal being presented in a first user interface portion and the version control client portal being presented in a second user interface portion; in response to the receiving of the instructions, executing the received instructions, the executing of the received instructions including: selecting, by the version control application, a particular version of the rule from the multiple versions of the rule stored in the system storage; and transitioning, by the process application, the particular version of the rule from the first state of the plurality of states to the second, different state of the plurality of states; and storing, in one of the one or more log records shared by the version control application and the process application, information resulting from the executing of the instructions received through the user interface that integrates the version control and process client portals.

In an aspect 2 according to aspect 1, the one or more shared log records are linked to the multiple versions of the rule.

In aspect 3 according to any one of aspects 1 to 2, a third user interface portion of the integrated user interface displays plural entries representing a given rule that is associated with a given state of the rule and a given version of the rule, and wherein the process client portal is for submitting data specifying a state transition of the given rule, and the version control client portal is for specifying a new version of the given rule.

In an aspect 4 according to any one of aspects 1 to 3, the method further includes modifying a given one of the plural entries through a rule editor portion being presented in the third user interface portion of the integrated user interface; generating a new rule based on the modified given entry; saving by the data processing system the new rule as a new version of the given rule; and automatically updating, by the data processing system, a given log record of the one or more shared log records with data specifying the new version of the given rule generated and an initial state of the new version of the given rule.

In an aspect 5 according to any one of aspects 1 to 4, the plural entries are rows that are rendered in the third user interface portion of the integrated user interface, which is a process interface portion, and with each of the rows including cells, of which one or more cells are modified through a further user interface portion of the integrated user interface, and the version control client portal is for specifying the new version of the given rule.

In an aspect 6 according to any one of aspects 1 to 5, the method further includes automatically updating by the data processing system a given log record of the one or more shared log records, with data specifying the new version of the given rule generated and an initial state of the new version of the given rule, based on actions performed through at least two of the first user interface portion, the second user interface portion, and the third user interface portion of the integrated user interface.

In an aspect 7 according to any one of aspects 1 to 6, the instructions are first instructions, and the method further includes receiving, through the integrated user interface, second instructions and in response to the receiving of the second instructions, executing the received second instructions, the executing of the received second instructions including: selecting a group of two or more rules from a plurality of rules stored in the system storage, each rule in the group being a particular version of a plurality of versions of the rules; associating the group of selected rules with a release tag; and transitioning the release tag from a first state of a plurality of states to a second state of the plurality of states.

In an aspect 8 according to any one of aspects 1 to 7, the information resulting from the executing of the instructions includes log information that represents the selecting performed by the version control application responsive to the received instructions and the transitioning performed by the process application responsive to the received instructions.

In an aspect 9 according to any one of aspects 1 to 8, the information resulting from the executing of the instructions includes the rule with the selected particular version and with the second state of the plurality of states.

In an aspect 10 according to any one of aspects 1 to 9, the process application is distinct from the version control application, and wherein the process application and the version control application are not configured to transmit data to each other and to receive data from each other.

In an aspect 11 according to any one of aspects 1 to 10, the process application is executed on a first server computer and the version control application is executed on a second server computer.

In an aspect 12 according to any one of aspects 1 to 11, the received instructions include one or more state instructions received through the process client portal presented in the first user interface portion and one or more version instructions received through the version control client portal presented in the second interface portion, and wherein: the selecting, by the version control application, of the particular version of the rule from the multiple versions of the rule stored in the system storage is performed in response to the receiving of the one or more version instructions specifying the particular version; and the transitioning, by the process application, of the particular version of the rule from the first state of the plurality of states to the second, different state of the plurality of states is performed in response to the receiving of the one or more state instructions specifying the state transition.

In an aspect 13 according to any one of aspects 1 to 12, the method further includes including receiving a user-initiated selection of the simulator client portal being presented in a fourth user interface portion of the integrated user interface; in response to receiving the selection of the simulation client portal: causing, by a simulator application being accessed by the version control client portal, the new rule represented by the entries to execute against a given input data record to perform a simulation of the execution of the new version of the given rule; and automatically updating, by the data processing system, a given log record of the one or more shared log records with information resulting from the simulation.

In an aspect 14 according to any one of aspects 1 to 13, the fourth user interface portion provides visualizations indicative of the simulation currently being performed.

In an aspect 15 according to any one of aspects 1 to 14, the visualizations includes input visualizations that indicate input data of the given input data record on which the new rule is executing during the simulation.

In an aspect 16 according to any one of aspects 1 to 15, the visualizations include visualizations indicating which rule case of the new rule has been triggered during the simulation.

In an aspect 17 according to any one of aspects 1 to 16, the visualizations include output visualizations indicating output data that results from the execution of the new rule against the given input data record during the simulation.

In an aspect 18 according to any one of aspects 1 to 17, the information resulting from the simulation includes data specifying that instructions were received to perform the simulation on the new version of the given rule.

In an aspect 19 according to any one of aspects 1 to 18, the information resulting from the simulation includes data that is indicative of the results of the simulation.

In an aspect 20 according to any one of aspects 1 to 19, the visualizations provided by the fourth user interface portion are indicative of the progress of the execution of the new rule in real-time.

In an aspect 21 according to any one of aspects 1 to 20, the plurality of states are a plurality of states of a development lifecycle or an approval process of the rule.

In an aspect 22 according to any one of aspects 1 to 21, the method further includes executing, through the integrated user interface, the particular version of the rule in the second, different state by: receiving, from the version control application or the process application, the particular version of the rule; generating a transform for transforming data based on the particular version of the rule in the second, different state; providing a data processing component including the transform to a dataflow graph; and executing the dataflow graph including using the data processing component to apply the transform to data inputted to the dataflow graph.

In an aspect 23 according to any one of aspects 1 to 22, the storing includes storing multiple versions of a ruleset in a system storage, in which the ruleset includes one or more rules, each rule including one or more rule cases that specify one or more values for the rule's output depending on the rule's input, and each rule case includes one or more input relationships in which the rule case is triggered by a given input record if one or more data values of the given input record meet the one or more input relationships; selecting includes selecting, by the version control application, a particular version of the ruleset from the multiple versions of the ruleset stored in the system storage; and transitioning includes transitioning, by the process application, the particular version of the ruleset from the first state of the plurality of states to the second, different state of the plurality of states.

In a general aspect 24, described is a computer-implemented method for managing one or more data structures for use with application programs in a data processing system, the method including: storing multiple versions of a data structure in a system storage; receiving instructions through a first user interface portion of a user interface that integrates plural client portals in plural user interface portions, and with information presented in the plural user interface portions being determined from one or more common log data objects shared by the application programs; in response to the receiving of the instructions, executing the received instructions, the executing of the received instructions including: selecting a particular version of the data structure from the multiple versions of the data structure stored in the system storage; and transitioning the particular version of the data structure from a first state of a plurality of states to a second, different state of the plurality of states; and storing, in one of the one or more common log data objects associated with the particular version of the data structure, information resulting from the executing of the instructions received through the first user interface portion.

In an aspect 25 according to aspect 24, the data structure is a graph data structure.

In an aspect 26 according to any one of aspects 24 to 25, the integrated user interface is configured to process the graph data structure by accessing an editor client portal and the one or more common log data objects to store new versions of the graph data structure provided from the editor client portal.

In an aspect 27 according to any one of aspects 24 to 26, the integrated user interface is configured to process the graph data structure with a process management client portal to manage states of the graph data structure.

In an aspect 28 according to any one of aspects 24 to 27, the graph data structure includes plural nodes and the integrated user interface includes a process management client portal to manage evaluations of nodes in the graph data structure by tracking the number of times that each node in the graph data structure was evaluated.

In an aspect 29 according to any one of aspects 24 to 28, the data structure is a configuration file data structure.

In an aspect 30 according to any one of aspects 24 to 29, the integrated user interface is configured to process a configuration file data structure by: accessing an editor client portal and the one or more common log data objects to store new versions of the configuration file data structure provided from the editor client portal.

In an aspect 31 according to any one of aspects 24 to 30, the integrated user interface is configured to process the configuration file data structure with a process management client portal to manage states of the configuration file data structure.

In an aspect 32 according to any one of aspects 24 to 31, the data structure is a decision chart data structure.

In an aspect 33 according to any one of aspects 24 to 32, the integrated user interface is configured to process a decision chart data structure by accessing an editor client portal and the one or more common log data objects to store new versions of decision chart data structure provided from the editor client portal.

In an aspect 34 according to any one of aspects 24 to 33, the integrated user interface is configured to process the decision chart data structure with a process management client portal to manage states of the decision chart data structure.

In an aspect 35 according to any one of aspects 24 to 34, the decision chart data structure includes plural nodes and the integrated user interface includes a process management client portal to manage states of the decision chart data structure by tracking which of nodes in the decision chart data structure are currently being executed.

Other features and advantages of the description will become apparent from the following description, and from the claims.

Unless otherwise defined, all technical and scientific terms used herein have the same meaning as commonly understood by one of ordinary skill in the art to which this invention belongs. In case of conflict with patents or patent applications incorporated herein by reference, the present specification, including definitions, will control.

DESCRIPTION OF DRAWINGS

FIGS. 3-6 are each examples of plural client portals in plural user interface portions sharing one or more log records.

FIG. 9B is a diagram illustrating various states in which various applications are accessible to various users.

FIG. 10 is screenshot example of a user interface that enables the use of release tags to manage groups of rulesets.

DESCRIPTION

Figure 1:
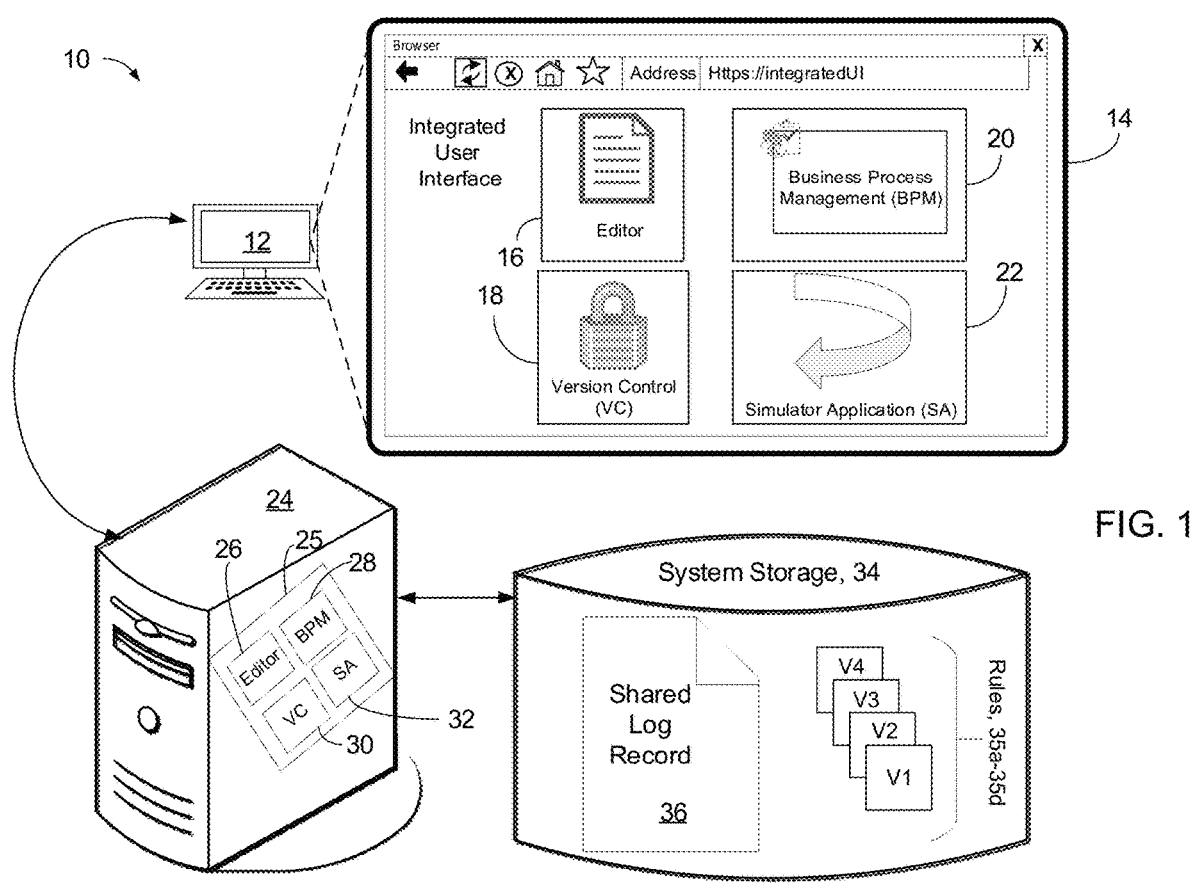
FIG. 1 is a block diagram of a system that presents plural client portals in plural user interface portions sharing one or more log records.

In this document, described is a novel integrated application development system for editing rules, simulating execution of application programs that incorporate the rules, managing and controlling multiple versions of the rules and multiple versions of containers of various combinations of the rules, and managing processes for authoring, reviewing, risk-checking, and approving the rules. The integrated application development system operates through an integrated user interface that enables users to properly, e.g., with less errors and/or in a more reliable manner, perform the functions mentioned above in a convenient and efficient manner. In some implementations, the integrated application development system provides intuitive user interfaces that enable people that are not experienced in software programming to develop sophisticated application programs that incorporate complex rules for processing records of customers or machines, e.g., millions or billions of customers or machines, without requiring these people to have deep knowledge about software programming. The integrated application development system enables these people to efficiently and properly author, revise, test, and optimize the rules so that new processes can be launched frequently and changes of processes, e.g., in response to changed customer preferences, market conditions, and/or technical environments can be addressed quickly.

The integrated application development system is used to edit, manage, simulate and control various types of data structures. The data structures include collections of data values, relationships among the data values, and functions or operations that can be applied to the data values. The data structures can be used to represent decision charts, graphs, configuration files, and rulesets, just to specify a few of the many examples of data structures that can be operated on by the integrated application development system.

For example, the integrated application development system can be used to edit decision charts, simulate execution of application programs that incorporate the decision charts, manage and control multiple versions of the decision charts and multiple versions of containers of various combinations of the decision charts, and manage processes for authoring, reviewing, risk-checking, and approving the decision charts.

In addition, the integrated application development system can be used to edit application configuration files, simulate execution of application programs whose parameter values are configured using the application configuration files, manage and control multiple versions of the application configuration files and multiple versions of containers of various combinations of the application configuration files, and manage processes for authoring, reviewing, risk-checking, and approving the application configuration files.

The integrated application development system can also be used to edit containers of various combinations of business rules, decision charts, and application configuration files, simulate execution of application programs that incorporate the containers, manage and control multiple versions of the containers, and manage business processes for authoring, reviewing, risk-checking, and approving the containers.

Rulesets

Referring to FIG. 1, networked system 10 includes client device 12, data processing system 24 (e.g., an application development system) and system storage 34. Data processing system 24 includes system manager application 25, which includes an editor application 26, a process management (here also called business process management, BPM) application 28 (also referred to a process application), a version control application (VC) 30 and a simulator application (SA) 32. Generally, an editor application includes an application or software program for modifying one or more digital resources, including, e.g., data records, entries in a database, business rules ("rules"), charts, executable dataflow graphs, application configuration files, containers, and so forth. In this example, system manager application 25 is configured to interface with system storage 34 and each of applications 26-32 also interfaces with system storage 34, e.g., by writing to shared log record 36.

The following describes the use of the system to manage rules, such as business rules or machine processes but the same principles can also be applied to using a similar system to manage other types of rules. Therefore, in the discussion below, unless otherwise noted, business rules and rules are used interchangeably.

A business rule includes a human-readable form of computations (e.g., computer program or executable logic) expressed as a data flow through an executable directed graph, with components of the computation being associated with the vertices of the graph and data flows between the components corresponding to links (arcs, edges) of the graph. Generally, a business rule can be expressed as a set of criteria or transformational logic that can be used, for example, for converting data from one format to another, making determinations about data, or generating new data based on a set of input data. A ruleset may include a set of rules that produces a single transform.

In some examples, an application is provided for such users to input a set of rules, referred to as a ruleset, in a format with which they are familiar, that tells the computer system what they want the associated transform to do. A rule may be composed of one or more rule cases that compute different values for the rule's output depending on the rule's input. In other words, each case of the one or more rule cases defines or includes a different transformational logic and computes the different values for the rule's output depending on the rule's input in accordance with the transformational logic. A rule may also include other rules. Rule cases specify one or more values for the rule's output depending on the rule's input, and each rule case is associated with or includes one or more input relationships in which a particular rule case of the one or more rule cases is triggered by a given input record (e.g., a given data record being input by the user for the rule) if one or more data values of the given input record meet the one or more input relationships. Other rules in a ruleset may produce values for additional or alternative outputs, as described in U.S. Pat. No. 8,069,129, the entire contents of which are incorporated herein by reference.

To implement rules in a graph-based computation environment, a transform is generated which receives input records, from one or more data sources, and inserts an output record into an output dataset. Input and output datasets may also be referred to as data streams. The transforms may be implemented in graph-based computations having data processing components connected by linking elements (e.g., links) representing data flows.

A transform may itself be a graph-based computation or may be implemented within a component of a graph. To simplify creation of transforms for non-technical users, a tool is provided for such users to input a set of business rules, referred to as a rule set, in a format with which they are familiar, that tells the computer system what they want the transform to do. A rule set is the set of rules that produce a single transform. A rule may be composed of one or more rule cases that compute different values for the rule's output depending on the rule's input. A rule may also include other rules. Other rules in a rule set may produce values for additional or alternative outputs. A rule set may contain other rule sets, which we refer to as "included" rule sets.

In an example, a generator receives as input a rule set from an editor and generates a transform. The generated transform may be provided to a graph-based computation system as a component to be used in a graph or as an entire graph itself, depending on the system's architecture and the purpose of the transform and the business rules. The generator may be, for example, a compiler, a custom-built program, or another graph-based computation configured using standard tools to receive the rule set and output the transform.

The generator may also update the transform when the rule set is edited. When the rule set is edited, the editor may provide the entire rule set to the editor or it may provide only the new or modified rules or rule cases. The generator may generate an entirely new transform to replace the original transform, or it may provide a component containing the transform, depending on the capability and needs of the system using the transform. Charts, executable dataflow graphs and application configuration files are each described in further detail below.

Generally, a process management application, also called BPM application herein, includes a program for transitioning a digital resource, such as a rule, from one state to another, different state. In general, each version of the ruleset is configured to be associated with a plurality of different states among which the ruleset can be transitioned, wherein the different states of the plurality of states are indicative of or associated with different phases or stages of a development lifecycle (or approval process) of the ruleset. The different phases or stages may include a sequence of "being edited"/"being created"/"being developed", followed by "being tested", followed by "being produced", or a sequence of "open", followed by "submitted for production", followed by "approved"/"verified"/"released". For example, the process management application may transition a rule or a ruleset from an "open" (e.g., non-approved or not verified) state to an "approved" or "verified" state. Generally, a VC application includes a program for updating or modifying versions of one more other applications or digital resources. Generally, an SA includes a program for simulating execution of one or more business rules (or other digital resources, such as, charts, application configuration files, and so forth) against test input (input data, records etc.).

In this example, system storage 34 stores shared log record 36, including, e.g., a log record that is used to provide a common, shared storage structure accessible by applications 26, 28, 30, 32 to store information (such as log information) provided by applications 26, 28, 30, 32. Applications 26, 28, 30, 32 are distinct applications that are not configured to transmit data to each other and/or receive data from each other. For example, the process management application 28 may be distinct from the version control application 30 and these two applications may not be configured to transmit data to each other and/or receive data from each other. System storage 34 also stores data structures, e.g., rules 35a-35d. Applications 26, 28, 30, 32 access shared log record 36 to determine which actions and operations can be performed on one or more of rules 35a-35d. For example, system 24 and/or each of applications 26, 28, 30, 32 may be programmed with executable logic specifying particular conditions for performing particular types of actions on a data structure (e.g., rule or ruleset). For example, BPM application 28 may be configured such that a particular version of a data structure (e.g., rule or ruleset) cannot be accessed by a given user through BPM application 28 if that same version of the data structure (e.g., rule or ruleset) is accessed through BPM application 28 by another user. As such, integrated user interface 14 enables control of modifications to (and access to) rules 35a-35d by each of applications 26, 28, 30, 32 through shared log record 36. Shared log record 36 specifies (or is used by system 24) to determine how each of rules 35a-35d can be accessed and/or modified.

Data processing system 24 generates data for integrated user interface 14, which may be rendered by a display of client device 12. Integrated user interface 14 includes portions 16, 18, 20, 22. Portions 16 and 22 are optional in user interface 14. Applications 26 and 32 are optional in system manager application 25. Portion 16 displays an editor client portal for causing editor application 26 to perform one or more actions, e.g., by modifying one or more digital resources (e.g., rulesets). Portion 18 displays a version control client portal (e.g., a source code control client portal) for causing VC application 30 to perform one or more actions, e.g., by transitioning or selecting a digital resource (e.g., ruleset) from one version to another version. Portion 20 displays a BPM client portal for causing BPM application 28 to transition a digital resource (e.g., ruleset) from one state to another state. For example, each version of the ruleset is configured to be associated with a plurality of states (as described above) including a first state and a second, different state of the plurality of states, wherein the different first and second states are indicative of (or associated with) different phases or stages of the development lifecycle (or approval process) of the ruleset as mentioned above. Portion 22 displays a simulator client portal for causing simulator application 32 to simulate execution of the digital resource (e.g., the ruleset with the version selected via the VC application) against one or more input data sets. Applications 26, 28, 30, 32 are controlled through portions 16, 18, 20, 22, respectively, of integrated user interface 14. The system 24 inserts into shared log record 36 log information, such as, log entries, representing the various actions performed by one or more of applications 26, 28, 30, 32 responsive to instructions received through one or more of portions 16, 18, 20, 22. System 24 generates or otherwise retrieves data in accordance with instructions received from each of applications 26, 28, 30, 32. These instructions specify which data and which types of data can be displayed in each respective portion 16, 18, 20, 22, e.g., based on contents of shared log record 36.

For example, shared log record 36 may specify that a particular version of a ruleset is already "check-out" for review by user A. Generally, a ruleset includes a collection or grouping of rules. As such, user B cannot also check out that same ruleset. But, user B could perform a simulation of the ruleset or generate a new version of the ruleset. As such, based on the contents of shared log record 36, portion 20 of integrated user interface 14 would not allow user B to transition the ruleset to another state. However, in this example, portions 18 and 22 would allow user B to save the ruleset as a new version and simulate execution of the ruleset, respectively. As such, through applications 26, 28, 30, 32, each of portions 16, 18, 20, 22 share and access shared log record 36. That is, system storage 34 stores shared log record 36 that controls the displays of data in integrated user interface 14 for each of portions 16, 18, 20, 22 that each display client portals for the distinct applications 26, 28, 30, 32. Additionally, when a user instructs, through one or more of portions 16, 18, 20, 22, one or more of applications 26, 28, 30, 32 to perform one or more actions, system 24 records in share log record 36 those actions, e.g., by inserting into shared log record 36 log information, such as log entries, representing those actions and also data representing an identity of a user performing those actions.

Each of the editor application 26, process management application 28, version control application 30, and simulator application 32 can write information, such as log information, to the shared log record 36. For example, the version control application 30 can write in the shared log record 36 log information specifying that a user associated with a particular user identifier checked out a particular version of a particular ruleset from the system storage 34, and a timestamp specifying the timing that the ruleset was checked out. The editor application 26 can write in the shared log record 36 log information about the user identifier associated with the user who edited the ruleset, and a timestamp specifying the timing for when the editing was performed. The process management application 28 can write in the shared log record 36 log information specifying that the user associated with the particular user identifier approved the transition of the ruleset from a first state to a second state, and a timestamp specifying the timing for the transition of states. The simulator application 32 can write in the shared log record 36 log information specifying that the user associated with the particular user identifier executed an application program using the ruleset to produce outputs, and a timestamp specifying the timing of the execution of the application program incorporating the ruleset. The simulator application 32 can write in the shared log record 36 log information specifying that the user associated with the particular user identifier retrieved stored outputs produced from a prior execution of the application program using the particular version of the particular ruleset, and a timestamp specifying the timing of the retrieval of the stored outputs. The above are just examples of the kind of log information, as used herein, that the applications 26, 28, 30, 32 can write to the shared log record 36. The applications 26, 28, 30, 32 can also write other types of log information to the shared log record 36. Logging information regarding, e.g., who accessed which rules, who edited which rules, who approved which rules, and when the above events occurred can help a company perform audits at a later time, e.g., to comply with legal or technical requirements or identify potential sources of errors.

In some examples, system 24 is executed in a distributed computing environment that includes, e.g., a group of computer servers or processors connected through a communication network, e.g., a wide area network (WAN), a local area network (LAN), or a network in a multi-processor system. System 24 can be executed on multiple processor cores of one or more chips connected through a network. Different client portals are executed on different computers or processors. In this example, the editor application 26 is executed on a first system, the process management application 28 is executed on a second system, the version control application 30 is executed on a third system, and the simulator application 32 is executed on a fourth system. One or more users interact with the editor application 26, process management application 28, version control application 30, and the simulator application 32 through the integrated user interface 14. Regardless of whether the applications 26, 28, 30, 32 are executed on the same or different server computers, the integrated user interface 14 provides an efficient, harmonized and a user-friendly interface that hides the complexities of the back-end processes to the user.

The editor application 26 can be linked to, or integrated with, the process management application 28, which manages the states of the rules using, e.g., tags described below. When the editor application 26 modifies a rule, the modification can propagate to the process management application 28 and affect the outputs of the application 28. In some examples, the outputs of the process management application 28 are updated automatically in response to changes made by the editor application 26. In some examples, the user has to manually request that the changes made by the editor application 26 be propagated to the process management application 28.

Similarly, the editor application 26 can be linked to, or integrated with, the version control application 30 so that, e.g., when a version of the rule is approved for release, that version of the rule is stored by the version control application 30, which maintains a master repository of various versions of the rules. The editor application 26 can be linked to, or integrated with, the simulator application 32, which enables simulation of execution of application programs that incorporate the business rules. When the editor application 26 modifies a rule, the modification can automatically propagate to the simulator application 32 and affect the outputs of simulator application 32. In some examples, modification of the rule triggers execution of the simulator application 32, and the outputs of simulator application 32 are updated automatically. In some examples, the user has to manually request execution of the simulator application 32 after the rule has been modified by the editor application 26 in order to obtain updated output from simulator application 32.

The process management application 28 can be linked to, or integrated with, the version control application 30, which enables the user to retrieve any version of the rule, determine the state of the rule, and modify the state of the rule using the integrated user interface 14. The process management application 28 can be linked to, or integrated with, the simulator application 32, which enables the user to use the integrated user interface 14 to modify the state of a rule after performing simulation of the execution of an application program incorporating the rule. The version control application 30 can be linked to, or integrated with, the simulator application 32, which enables the user to use the integrated user interface 14 to incorporate any version of a rule into an application program and perform a simulation of the execution of the application program incorporating the rule.

The integrated user interface 14 allows the users to access the editor application 26, the process management application 28, the version control application 30, the simulator application 32, and the shared log record 36 using interfaces that have a consistent structure, look-and-feel, e.g., having similar overall design, color scheme, menu structure, and font characteristics.

Applications 26, 28, 30, 32 are represented as separate modules in this example. In some examples, two or more of applications 26, 28, 30, 32 can be configured as one unit or module. In some examples, applications 26, 28, 30, 32 can all be implemented as one integrated module. In some examples, each of applications 26, 28, 30, 32 can be implemented by two or more modules. In some examples, several modules may be used in which each module implements a portion of the functions of applications 26, 28, 30, 32. Each or all or some portions of the applications 26, 28, 30, 32 may be implemented in software, hardware, or a combination of software and hardware.

Figure 2:
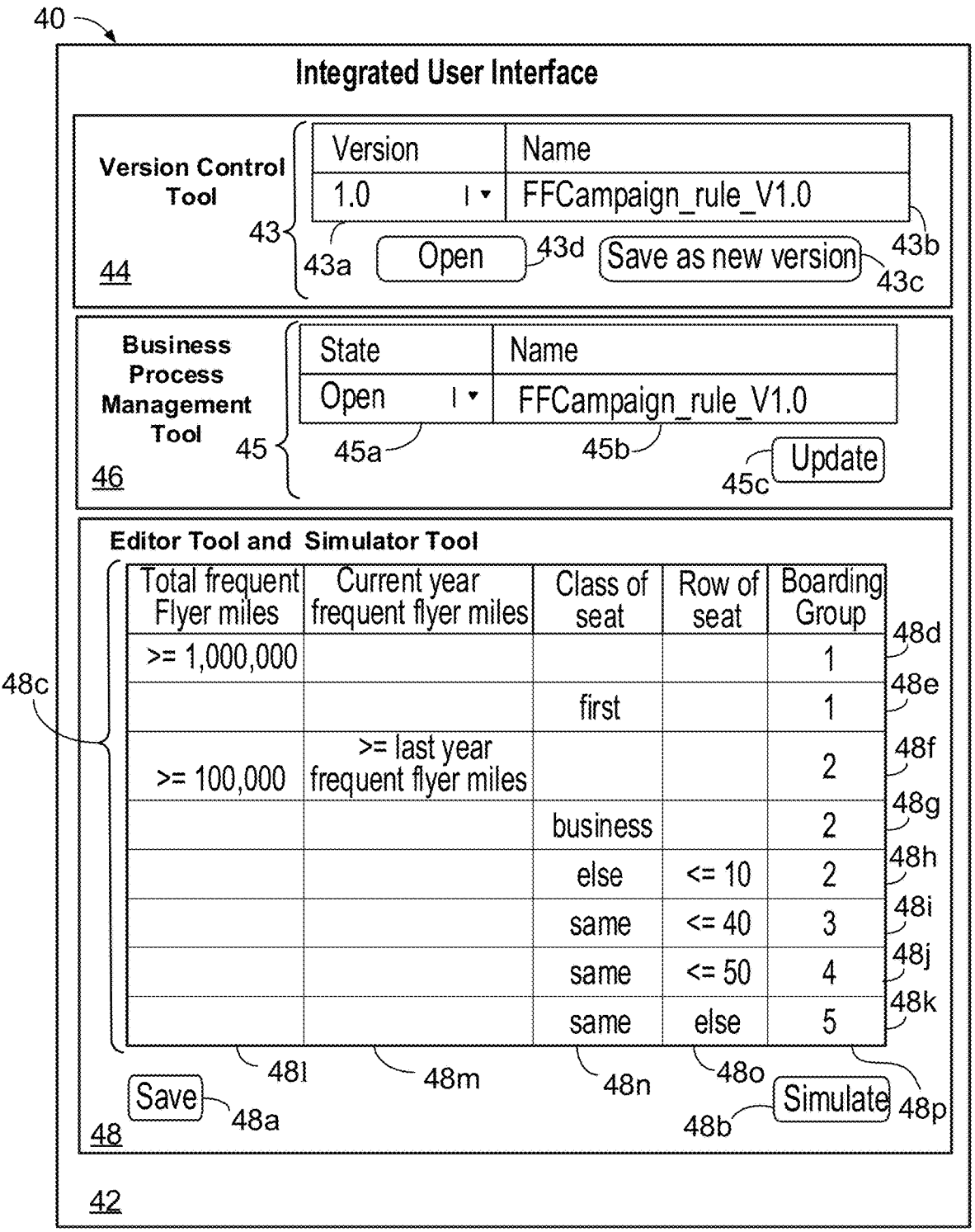
FIG. 2 is a screenshot example of an integrated user interface that renders plural client portals that share one or more log records.

Referring to FIG. 2, diagram 40 illustrates integrated user interface 42 with portion 44 for presenting version control client portal 43, portion 46 for presenting process management client portal 45 (also referred to as a process client portal), and portion 48 for presenting editor client portal 48c and simulator client portal 48b. Version control client portal 43 includes selection client portal 43a for selecting an appropriate version, naming client portal 43b for entering an appropriate name of a selected version—when creating a new version (or for displaying the name of an opened version), save as new version client portal 43c for saving a new version of a rule or ruleset and open control 43d for opening a selected version of a rule or ruleset.

Process management client portal 45 includes state control 45a for transitioning a rule, a ruleset or other digital resource from one state to another state, naming control 45b displaying a name of a rule or ruleset for which a state is being viewed, and update control 45c for updating a state of a rule or ruleset. Editor client portal 48c is a table (hereinafter table 48c) with rows 48d-48k and columns 48l-48p. Each combination of a particular one of rows 48d-48k and a particular one of columns 48l-48p specifies a cell in table 48c. Table 48c represents a rule and each of rows 48d-48k represents a particular rule case. Portion 48 includes save control 48a, selection of which saves in system storage the rule as specified in table 48c and any edits. Portion 48 also includes simulation client portal 48b, selection of which causes the system to simulate execution of the rule represented in table 48c against one or more test inputs.

Figure 3:
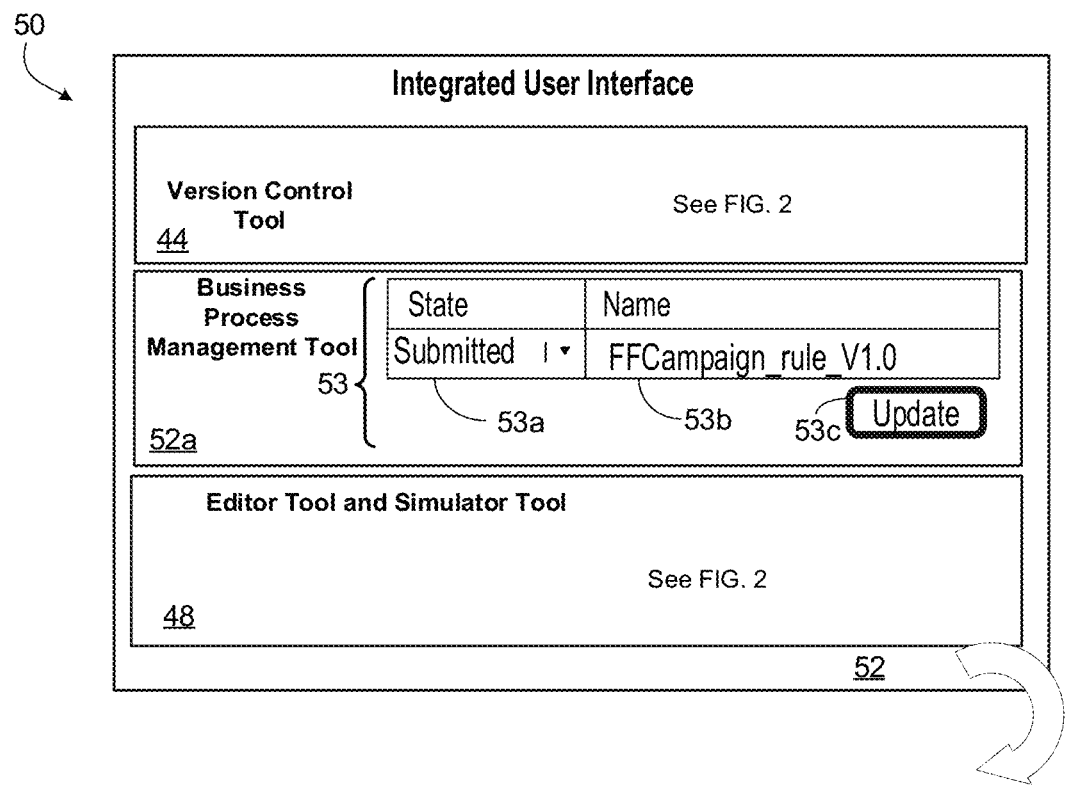

Referring to FIG. 3, diagram 50 illustrates updating of shared log record 54, based on instructions received through portion 52a of integrated user interface 52. In this example, a user has selected version 1.0 of a rule, as specified in version control portion 44. Portion 52a displays BPM client portal 53, with state control 53a and identifier (e.g., naming) control 53b. In portion 52a, state control 53a is selected to transition the rule from an open state to submitted state. Selection of update control 53c causes integrated user interface 52 to send instructions to the system, with the instructions specifying that the state of the "FFCampaign_rule_V1.0" rule has transitioned from an open state to a submitted state. Upon receipt of these instructions, the system executes the received instructions by updating or transitioning the state of the "FFCampaign_rule_1.0" rule (as specified in naming control 45b FIG. 2) from open state 51a to submitted state 51b. (In a variation, the state may be transitioned to an approved state and/or transitioned from a submitted state to an approved state). The systems may also save in system storage 55 rule 57, which is the "FFCampaign_rule_1.0" rule in the submitted state.

The system generates, in system storage 55, shared log record 54 (or updates shared log record) with log entry 54a that specifies the operation (or action) performed—namely "changed state", the user who instructed the system to perform the action, a comment specifying that the state of the FFCampaign_rule_V1.0 has been updated to submitted, and a date and time of the state transition.

Referring to FIG. 4, diagram 60 illustrates integrated user interface 61 with portions 52, 62, 64. Portion 64 presents editor client portal 64a, which is a table, save control 64b and simulate control 64c. A user modifies the rule by changing a value in cell 64b to be ">=200,000." Previously, this value was ">=100,000," as shown in FIG. 2. Upon making this modification, the system stores the rule represented in editor client portal 64a as a new version of the rule in accordance with instructions specified in portion 62. The rule may be in a given state such as the final state of the development lifecycle or approval process (e.g., "produced" or "submitted" as illustrated in FIGS. 3 and 4).

Portion 62 presents version control client portal 63 with selection control 63a, naming control 63b, save as new version control 63c and open control 63d. In this example, a user (automatically) generates a new version—version 2—of the FFCampaign_rule_V1.0 (which is saved in system storage as rule 68a) by modifying the value in cell 64b. This new version may alternatively be generated by using selection control 63a. In any case, selection control 63a may be used to select "2.0" as new version, leading to automatic updating of the name specified in the naming control 63b to "FFCampaign_rule_V2.0". Selecting save as new version control 63c causes the system to save, in system storage 55, this rule 68a as a new 2.0 version 68b in an initial state of the development lifecycle, submission or approval process, such as the "in development" state or the "open" state. Additionally, the system generates or updates, in system storage 55, shared log record 66 with log entries 66b, 66c specifying the edit of the rule and the saving of the rule as a version respectively. Shared log record 66 includes log entry 66a, which is the same as log entry 54a. In a variation, the system will generate a new version of a rule or ruleset first and then a user can edit that new, generated version of the rule or ruleset.

Figure 5:
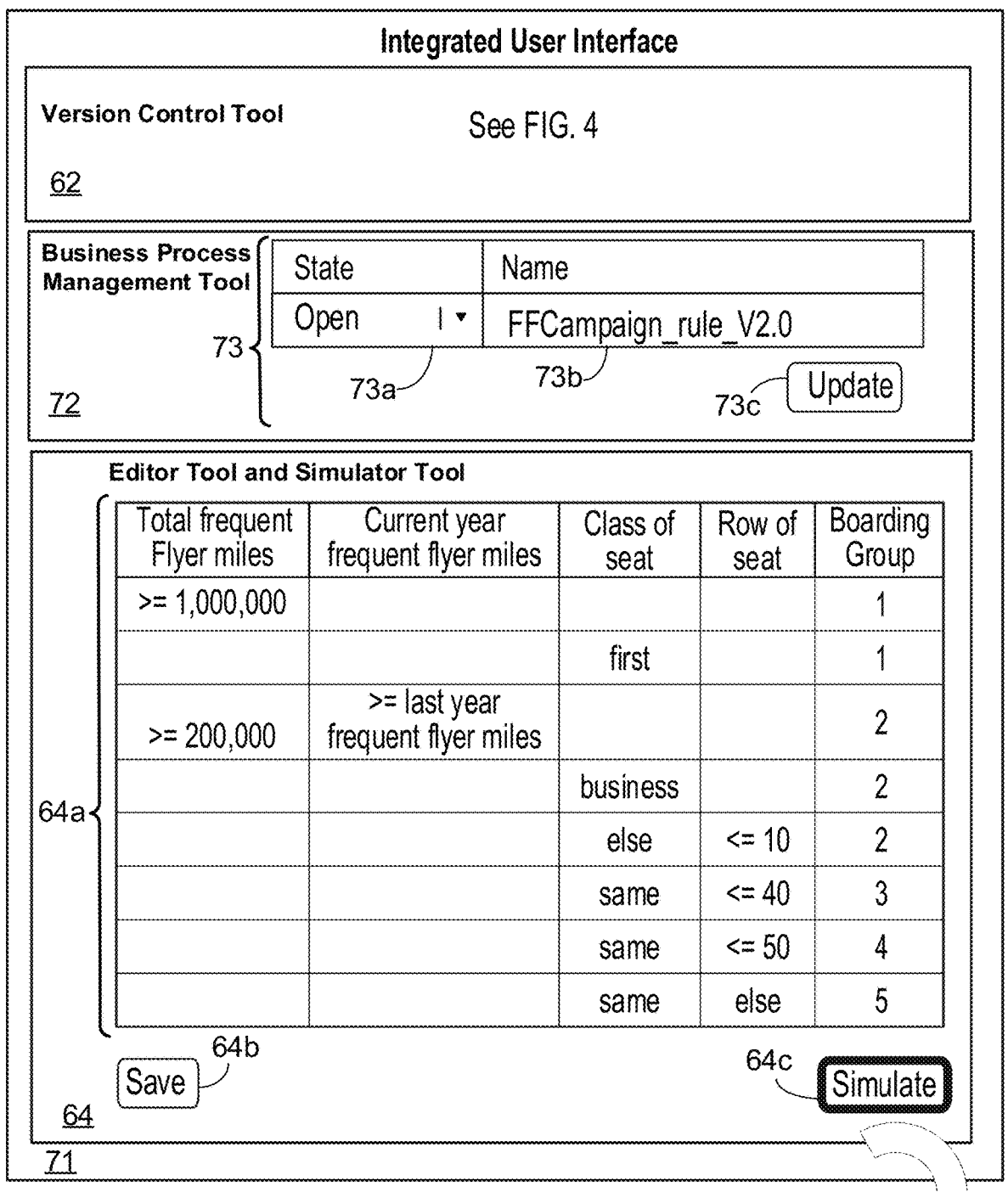

Referring to FIG. 5, diagram 70 displays integrated user interface 71 that specifies, in portion 72, that the newly generated version of the rule has an "open" state. In particular, portion 72 includes BPM client portal 73 with selection control 73a (that specifies an "open" state for version 2 of the rule), naming control 73b and update control 73c. In this example, a user wants to test the new version of the rule, e.g., before entering it into production. To do so, simulation client portal 64c is selected, selection of which causes the rule represented in table 64a to be executed against test input data, such as a given input record (i.e., a given data record inputted by the user to the rule). Upon selection of simulation client portal 64c, the system updates shared log record 74 with log entry 74d that specifies the instructions were received to perform a simulation on the version 2 of the rule. Shared log record 74 includes log entries 74a-74c, which correspond to log entries 66a-66c, respectively.

Figure 6:
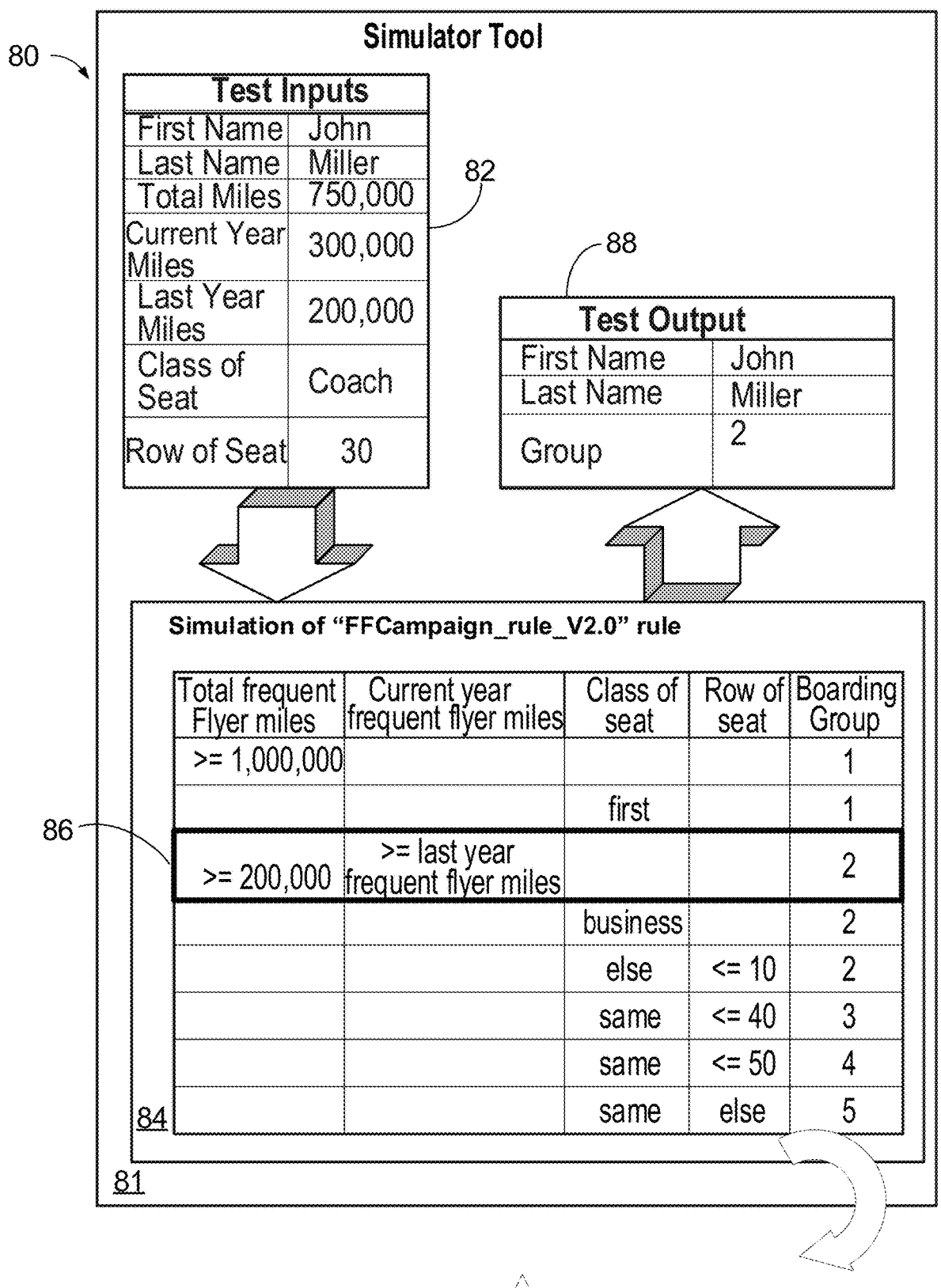

Referring to FIG. 6, diagram 80 illustrates simulator client portal interface 81 that provides visualizations indicative of the simulation being performed and also illustrates that the system generates shared log record 90 in response to performing the simulations. Interface 81 displays input visualizations 82 that represent the test input data on which the rule is executing during the simulation. Interface 81 also includes simulation portion 84 that visually displays which rule case has been triggered. In this example, rule case shown in row 86 has been triggered. Interface 81 also displays test output visualization 88 that represents the output data that results from execution of the simulation on the test input data. Based on results of the simulation, the system also generates or updates shard log record 90 with log entry 90e that provides data that is indicative of the simulation results (e.g., a portion of the output data of the simulation, which criterion of the rule was met by the test input data during the simulation, wand/or which rule case was triggered during the simulation etc.). Shared log record 90 also includes log entries 90a-90d which correspond to log entries 74a-74d, respectively. The visualizations associated with the ongoing simulation amounts to technical information pertaining to the state of the underlying data processing system during the execution of the rule set and assist the developer or user to monitor the correct or proper operation of the underlying data processing system and/or the simulated ruleset. That is, the integrated user interface together with the content presented assists the developer or user in efficiently developing new rule sets that yield proper or desired output data and that execute in a proper or desired manner. The risk of application of a wrong or erroneous ruleset to the data processing system can therefore be circumvented, which leads to less malfunction of the data processing system.

Tagging

In some implementations, the techniques described herein are applied to tagging (e.g., business tagging). Rulesets can be managed by using tags. Tags are data objects that contain information about corresponding rulesets. The tags used to manage rulesets can be, e.g., extensible markup language (XML) tags, but can also be other types of data objects. The following describes the use of tags to manage business rules, but the same principle can also be applied to using tags to manage other types of rules. The same principle can be applied to using tags to manage decision charts, application configuration files, containers of rules, containers of decision charts, containers of application configuration files. The same principle can be applied to using tags to manage containers that include a combination of two or more of rules, decision charts, and application configuration files.

A rule specification or a ruleset may go through several stages or phases of a development lifecycle or approval process. For example, referring to the development lifecycles as an example, different phases or stages in that lifecycle may be development or creation, testing, and production. For example, referring to the approval process as an example, different phases or stages in that process may be open, submitted for production (or review), and approved (or verified or released). Each stage of the development lifecycle or approval process are also referred herein to as a "state".

A tagging specification specifies permissible transitions for states "Development," "Testing," and "Production" associated with a ruleset. The permissible transitions include a transition from "Development" to "Testing," a transition from "Testing" to "Production," a transition from "Testing" to "Development," and a transition from "Production" to "Testing." Tags are used herein to record the state associated with the ruleset. For example, in some implementations, when that the ruleset transitions from the "Development" state to the "Testing" state, the ruleset itself does not change, rather, the tag associated with (or pointing to) the ruleset changes from the "Development" state to the "Testing" state.

As the tag associated with the ruleset transitions among the various possible states of the plurality of states, the tag associated with the ruleset contains information that keeps track of the state associated with the ruleset. Thus, when a ruleset is promoted or demoted to be associated with a different state, the content of the tag is updated to reflect the current state associated with the ruleset.

In some implementations, two or more types of tags can be used to manage rulesets. For example, one type of business tags can be "object tags" that are used for application configuration files and rulesets generated by business users. Business users can generate object tags when they publish application configuration files or rulesets. One type of business tags can be "technical tags" that are used for generic graphs, application templates, record format files, and packages that are generated by developers. A technical tag can be used to identify the versions of the generic graphs, application templates, and other objects to be used for a release. One type of business tags can be "release tags" that are used to identify the technical tags and the object tags that define the contents of a release of a ruleset or an application that uses one or more rulesets.

Figure 7:
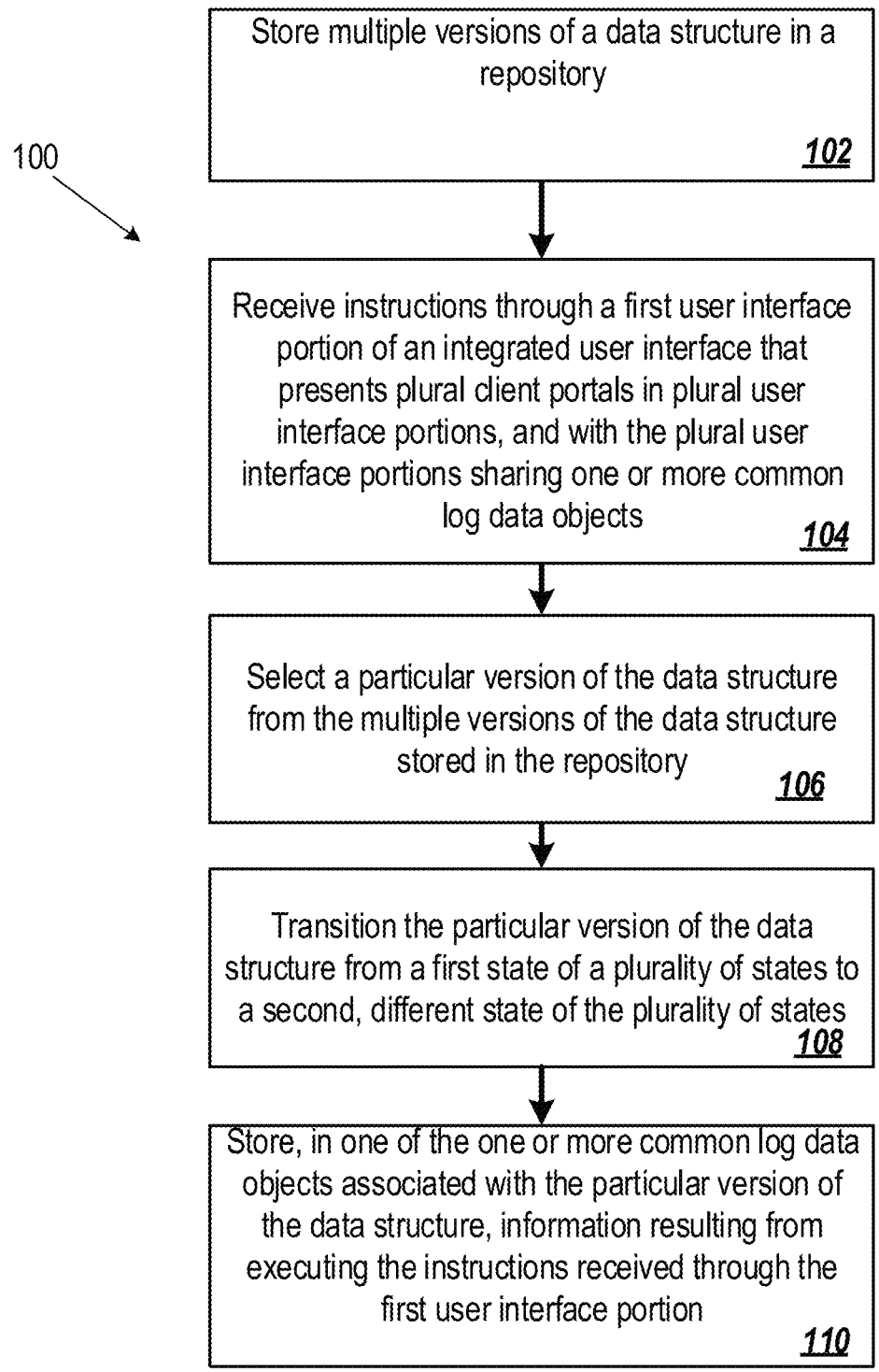
FIGS. 7, 8 are each a flowchart of a process for presenting plural client portals in plural user interface portions sharing one or more log records.

Referring to FIG. 7, process 100 is shown for managing one or more data structures for use with an application program (e.g., one or more of an editor application, a simulator application, a version control application and a BPM application) in a data processing system. In operation, the system stores (102) multiple versions of a data structure (e.g., a rule or ruleset, a container, a chart, and so forth) in a repository (e.g., system storage 34). The system receives (104) instructions through a first user interface portion of an integrated user interface that presents plural client portals (e.g., client portals 43, 45, 48c, 48b in FIG. 2) in plural user interface portions (e.g., portions 44, 46, 48 in FIG. 2). The plural user interface portions share one or more common log data objects (e.g., a shared log record). In response to the instructions, the system selects (106) a particular version of the data structure from the multiple versions of the data structure stored in the repository. The system transitions (108) the particular version of the data structure from a first state of a plurality of states to a second, different state of the plurality of states. The system stores (110), in one of the one or more common log data objects associated with the particular version of the data structure, information resulting from executing the instructions received through the first user interface portion.

Figure 8:
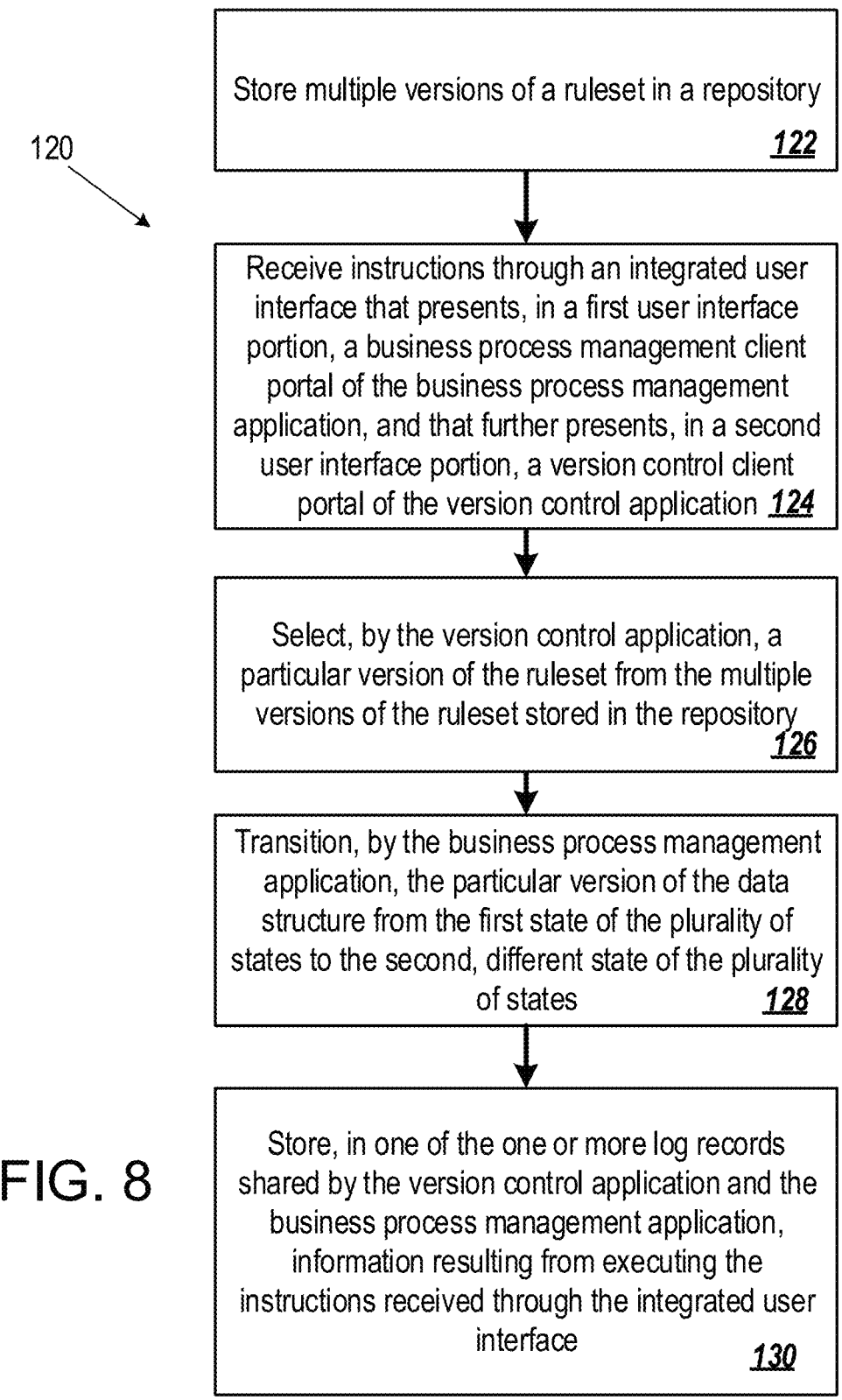

Referring to FIG. 8, process 120 for managing one or more rulesets for use with a process management application and a version control application in a data processing system is shown. In operation, the system stores (122) multiple versions of a ruleset in a repository (e.g., system storage 34), in which the ruleset includes one or more rules, each rule including one or more rule cases that specify one or more values for the rule's output depending on the rule's input, and each rule case includes one or more input relationships in which a rule case is triggered by a given input record if one or more data values of the given input record meet the one or more input relationships. Each version of the ruleset is configured to be associated with a plurality of states including a first state and a second, different state of the plurality of states.

The system receives (124) instructions through an integrated user interface that presents, in a first user interface portion, a process management client portal of the process management application, and that further presents, in a second user interface portion, a version control client portal of the version control application, with the instructions specifying one or more selections of each of the process management client portal and the version control client portal, and with at least the version control and process management applications sharing one or more log records of the data processing system. In response to the instructions, the system selects (126), by the version control application, a particular version of the ruleset from the multiple versions of the ruleset stored in the repository. The system transitions (128), by the process management application, the particular version of the data structure from the first state of the plurality of states to the second, different state of the plurality of states. The system stores (130), in one of the one or more log records shared by the version control application and the process management application, information resulting from executing the instructions received through the integrated user interface.

Figure 9A:
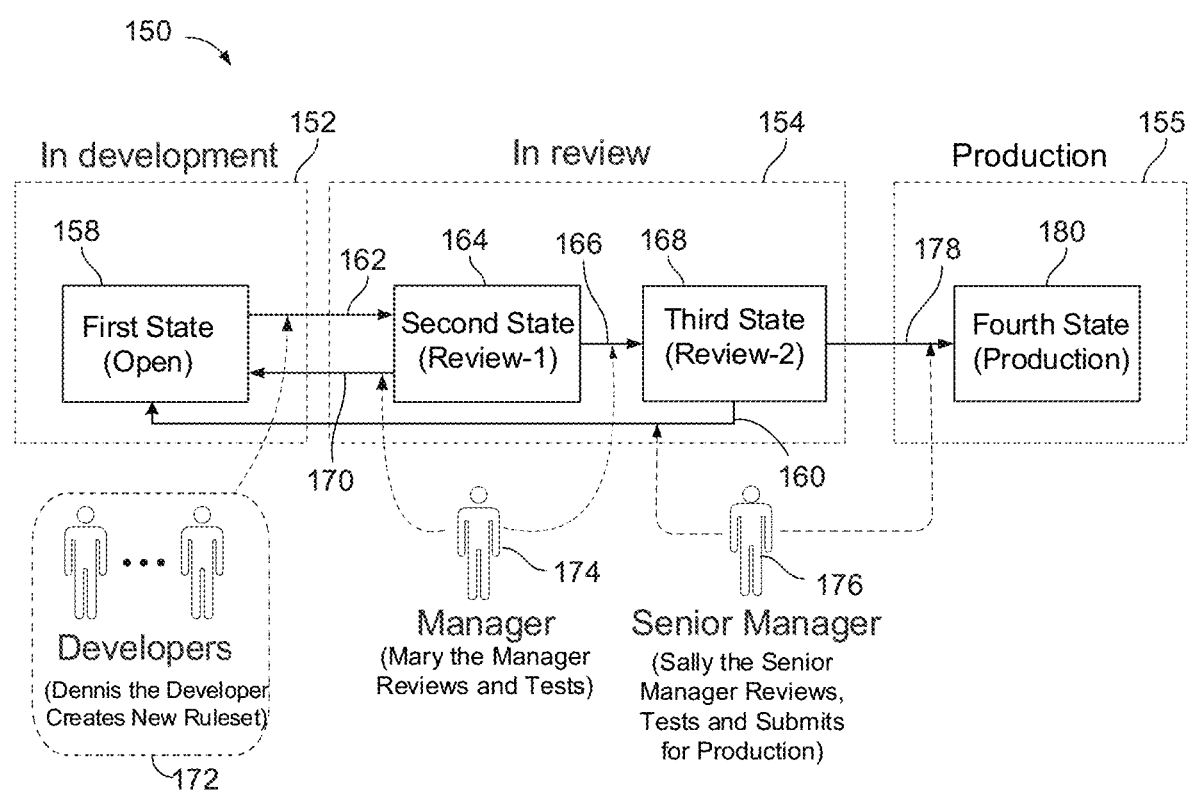
FIG. 9A is a block diagram of an example of a ruleset approval process.

Referring to FIG. 9A, an exemplary ruleset approval process 150 includes a development phase 152, a review phase 154, and a released phase 155. In the development phase 152, the ruleset is associated with a first state 158. In the review phase 154, the ruleset can be associated with one of two states: a second state 164 and a third state 168. In the released phase 155, the ruleset is associated with a last state 180. For example, the first state can be an "Open" state, the second state can be a "Review-1" state, the third state can be a "Review-2" state, and the last state can be a "Released" state. A tag associated with the ruleset keeps track of the state associated with the ruleset. The tag transitions through various states, representing the ruleset going through the various stages in the approval process.

When the tag associated with the ruleset is in the first state 158, developers 172 can generate and modify the ruleset, and promote (or submit) the ruleset so that the tag transitions 162 to the second state 164. When the tag is in the second state 164, the ruleset is reviewed by a manager 174, and the developers 172 cannot modify the ruleset or change the state of the tag. The tag associated with the ruleset may contain information about the review history for the ruleset. The manager 174 can either promote (or approve) the ruleset so that the tag transitions 166 to the third state 168, or demote (or reject) the ruleset so that the tag transitions 170 back to the first state 158. When the tag transitions 170 back to the first state 158, the developers 172 can further modify the ruleset and then promote the ruleset for further review.

When the tag associated with the ruleset is in the third state 168, the ruleset is reviewed by a senior manager 176, and the developers 172 and the manager 174 cannot modify the ruleset or change the state of the tag. The senior manager 176 can either promote (or approve) the ruleset so that the tag transitions 178 to the last state 180, or demote (or reject) the ruleset so that the tag transitions 160 back to the first state 158. When the tag transitions 160 back to the first state 158, the developers 172 can modify the ruleset and promote the ruleset for further review. When the tag is in the last state 180, the state of the tag can no longer be modified. For example, when the senior manager 176 promotes the ruleset and the tag transitions to the last state 180, it may indicate that the ruleset is ready to be released to a customer or a machine and no further modification to the ruleset is allowed.

In some implementations, two or more business rulesets can be packaged together in a "container," "collection," or "release" and be managed as a group. The container can be associated with one of several states, and each of the business rulesets in the container can also be associated with a state that can be either related to, or independent of, the state of the container. The container can be associated with a tag that has information about the state associated with the container.

For example, a software product may undergo several releases or versions, in which each release of the software product may include a plurality of business rulesets. Different releases may be associated with different combinations of business rulesets. A "release tag" or "group tag" may be used to store information about a group of rulesets related to a release of the software product. Different releases of the software product may be associated with different release tags.

Referring to FIG. 9B, table 190 illustrates when various applications are available to various users as a ruleset transitions among a plurality of states. In this example, table 190 includes cells 192a-192x. Cell 192a represents an editor application. Cell 192b represents a version control application. Cell 192c represents a BPM application. Cell 192d represents a simulator application. Cells 192e-192i represent a first state (e.g., first state 158 in FIG. 9A) in which a developer, e.g., Denis the developer, creates a ruleset. Cells 192j-192n represent a second state, e.g., state 164 in FIG. 9A, in which Mary the Manger reviews and tests the ruleset. Cells 192o-192s represent a third state, e.g., state 168 in FIG. 9A, in which Sally the Senior Manager reviews, tests and submits for production or release of the ruleset. Cells 192t-192x represent a fourth state, e.g., state 180 in FIG. 9A, in which the ruleset is produced or released.

In this example, in the first state, a ruleset can be edited (via an editor as represented in cell 192a), a new version of a ruleset can be created (via a version control application represented in cell 192b) and a ruleset can be simulated (via a simulation application as represented in cell 192d). In this first state, the process management state (e.g., a state indicated whether the ruleset is open, approved, in production, etc.) of the ruleset cannot be modified. As described below, this process management state can only be modified once the ruleset has transitioned to the third or fourth state. In the first state, the developer submits the ruleset for review. This submission causes the system to transition the ruleset to a second state, e.g., by updating a field in a tag or other data structure for the ruleset with information specifying that the second state is the current state.

In this example, the tag includes data (or references another data structure that includes the data) specifying which applications are available to which users in various states. For example, the tag includes data specifying that in a first state only a developer is able to edit, perform version control operations and simulate a ruleset. No other types of users are able to perform any operations on the ruleset in the first state. The tag includes other data (or references other data) specifying which users are able to perform which operations in the other states.

In the second state, only a manager (or other specified type of user) can simulate the ruleset, as specified by cell 192n. In this example, the manager cannot edit the ruleset (as indicated by a lack of a checkmark in cell 192k) and cannot generate a new version of the ruleset (as indicated by a lack of a checkmark in cell 192l). However, the manager is allowed the transition the state from an open state to a reviewed state, as indicated by cell 192m. That is, the manager can cause the ruleset to transition from the second state to a third state, e.g., by transmitting instructions to the system to send the ruleset to a senior manager for approval.

In the third state, a senior manager still cannot edit or modify a version of a ruleset (as indicated by empty cells 192p, 192q). Additionally, in the third state, no other users, e.g., developers or managers, can perform operations on the ruleset. Additionally, the senior manager can still test the ruleset via a simulation application as represented by cell 192s. Additionally, the senior manager can change or request to change the process management state of the ruleset from a reviewed state to a submitted state, as indicated by the checkmark in cell 192r. Following instructions to transition the ruleset to a submitted state, the ruleset is released in production. That is, upon submission of instructions to transition the ruleset from the third state to the fourth state in which the process management state is one of "released" or in production, the system updates a tag for the ruleset. The tag is updated with data specifying that the ruleset is released (as specified in cell 192w) and that the ruleset can no longer be edited or simulated (as specified by blank cells 192u, 192x) and that a new version cannot be generated (as specified by blank cell 192v).

Referring to FIG. 10, a user interface 200 shows a release tag "CEP_release_V1.1" 204 associated with a group of rulesets, in which the release tag "CEP_release_V1.1" 204 includes information about a group of object tags 206, such as "Investigate_Customer_Activity_V1.1," "Transaction_Classification_V1.1," "Review_Phone_Activity_V1.1," "Review_Posted_Monetary_Activity_V1.1," "Review_Web_Activity_V1.0," and "Review_Non_Monetary_Activity_V1.0." Each of the object tags 206 points to a corresponding ruleset. The release tag "CEP_release_V1.1" 204 is associated with a state "Open" 202. The release tag "CEP_release_V1.1" 204 includes information about the current state associated with the group of rulesets. The object tags 206 associated with the rulesets, such as "Investigate_Customer_Activity_V1.1," "Transaction_Classification_V1.1," "Review_Phone_activity_V1.1," "Review_Posted_Monetary_Activity_V1.1," "Review_Web_Activity_V1.0," and "Review_Non_Monetary_Activity_V1.0" are associated with the states 208 "Submitted," "Submitted," "Submitted," "Submitted," "Approved," and "Approved," respectively. Each of the object tags "Investigate_Customer_Activity_V1.1," "Transaction_Classification_V1.1," "Review_Phone_Activity_V1.1," "Review_Posted_Monetary_Activity_V1.1," "Review_Web_Activity_V1.0," and "Review_Non_Monetary_Activity_V1.0" keeps track of the current state associated with the corresponding ruleset.

In this example, the state associated with the group release tag "CEP_release_V1.1" 204 is different from the states 208 associated with the rulesets in the group. In some implementations, the states associated with the individual rulesets in a group are independent of the state associated with the group. Thus, when the release tag transitions among various states, the states associated with the individual rulesets does not change (unless the user specifically modifies the states of the object tags associated with the rulesets). For example, when the group release tag "CEP_release_V1.1" 204 transitions from "Open" state to "Submitted" state, from "Submitted" state to "Approved" state, or from "Submitted" state to "Open" state, the states associated with the rulesets 206 remain the same. Similarly, when one or more object tags associated with one or more of the rulesets 206 change states, the state of the group release tag 204 does not change (unless the user specifically modifies the state of the group release tag 204).

In some implementations, the states associated with the rulesets in a group are influenced by the state associated with the group. For example, a tagging specification can specify that the group can be associated with one of N states (N being a positive integer greater than or equal to 2), and each ruleset in the group can be associated with one of the N states. The tagging specification can further specify that, when the group release tag is promoted from the (i−1)-th state to the i-th state, the object tags (associated with the rulesets) that have states later than the i-th state are demoted to the i-th state, whereas the object tags that have states earlier than the i-th state remain unchanged.

For example, the tagging specification can specify that when the group release tag is promoted from the (i−1)-th state to the i-th state, the object tags (associated with the rulesets) that have states earlier than the i-th state are also promoted to the i-th state, whereas the object tags that have states later than the i-th state remain unchanged.

For example, the tagging specification can specify that when the group release tag is demoted from the (i+1)-th state to the i-th state, the object tags (associated with the rulesets) that have states later than the i-th state are also demoted to the i-th state, whereas the object tags that have states earlier than the i-th state remain unchanged.

For example, the tagging specification can specify that when the group release tag is demoted from the (i+1)-th state to the i-th state, the object tags (associated with the rulesets) that have states earlier than the i-th state are also promoted to the i-th state, whereas the object tags that have states later than the i-th state remain unchanged.

The states that are allowed to be associated with the group release tag 204 can be different from the states that are allowed to be associated with the object tags 206 (associated with the rulesets). For example, the tagging specification may specify that the group release tag 204 can be associated with one of "Open," "Review-1," "Review-2," or "Released" states, whereas each object tag 206 can be associated with one of "Open," "Submitted," or "Approved" states.

The tags, which are data objects, can include various types of information associated with the development or approval of the ruleset. The tags can provide the function of shared log records. The various types of information can include, e.g., what actions (e.g., promote, demote, submit, approve, or reject) were performed on the ruleset, who performed the actions, and when the actions were performed. The tags can also include comments or notes by the people who developed, tested, reviewed, and/or approved the rulesets. This way, at each stage of the development lifecycle or approval process of the ruleset, the person working on the ruleset can have useful information about the work that has previously been done on the ruleset, enabling the person to quickly focus on issues that need to be addressed. When something goes wrong, the user can look at the review history and attempt to identify what went wrong, where the mistake occurred, and take corrective action so as to avoid that type of problem in the future.

Figure 11:
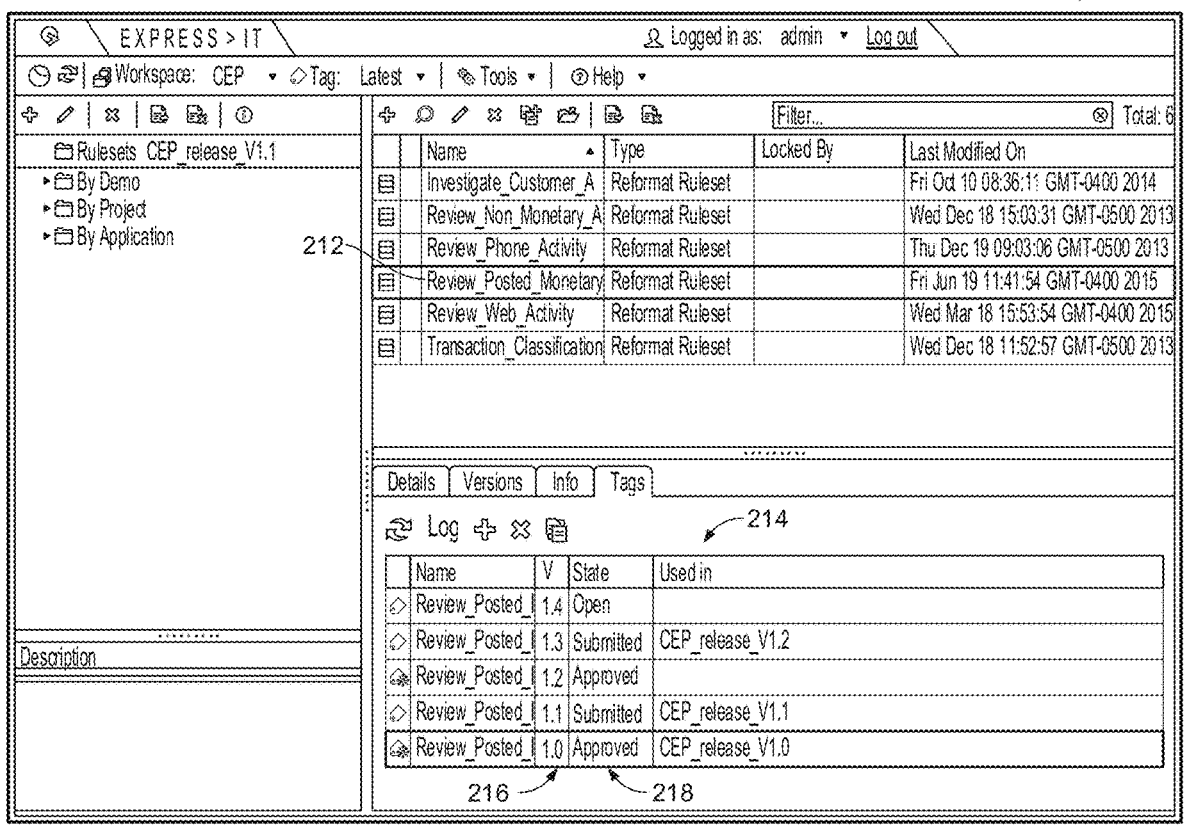
FIG. 11 is a screenshot example of a user interface for managing rules.

FIG. 11 shows an exemplary user interface 210 provided by an editor application showing several rules that a user is developing. In this example, the user is working on rules these rules:
  "Cash_Back_Notifications,"
  "Review_Non_Monetary_Actions,"
  "Review_Phone_Activity,"
  "Review_Posted_Monetary_Activity,"
  "Review_Web_Activity," and
  "Transaction_Classification" rules.

The user selected "Review_Posted_Monetary_Activity" rule 212, and an editor application (e.g., editor application 102) shows information 214 about various versions of the rule 212. In this example, versions 1.0 (as shown by cell 216) and 1.2 of the rule have been approved (as shown by cell 218), versions 1.1 and 1.3 of the rule have been submitted, and version 1.4 of the rule is open. Version 1.0 of the rule is used in CEP (the name of the workspace) release version 1.0, version 1.1 of the rule is used in CEP release version 1.1, and version 1.3 of the rule is used in CEP release version 1.2.

The editor application is linked to a version control application so that when a version of the rule is approved for release, that version of the rule is stored by the version control application, which maintains a master repository (e.g., system storage 34) of various versions of the rules. Subsequently, when a user intends to edit a particular version of the rule, the user can request permission to change the rule, and the version control application will allow the user to check out the rule and edit the rule, and prevent others from editing the rule until the rule is checked back in. The version control client portal 106 also keeps a record of the user who made changes to the rule, and what changes were made to the rule.

A feature of the business tagging approach is that the user may pick and choose among different versions of various rules to assemble a ruleset container or package for use with an application, and simulate the execution of the application using the assembled ruleset container. For example, a developer of a credit card company may use the application development system to develop rules for a credit card processing application. The application may use a "credit card approval" rule for deciding whether to approve credit card applications, a "credit card rewards" rule for deciding what rewards to give to credit card customers, and a "fraud detection" rule to evaluate the possibilities that certain credit card transactions are fraudulent. For example, the developer may have developed versions 1.0, 1.1, 1.2, and 1.3 for the "credit card approval" rule, versions 1.0, 1.1, 1.2, 1.3, 1.4, 2.0, and 2.1 for the "credit card rewards" rule, and versions 1.0, 1.1, 2.0, 2.1, 3.0 and 3.1 for the "fraud detection" rule.

For example, the developer may decide to simulate the execution of the credit card processing application using version 1.1 of the "credit card approval" rule, version 2.1 of the "credit card rewards" rule, and version 3.0 of the "fraud detection" rule. The editor application may provide an interface to allow the user to select particular rules, and a particular version of each of the selected rules to be packaged together in a container, and associate the container of rules with the credit card processing application.

Similarly, the user may also pick and choose among different versions of various decision charts and/or application configuration files, in addition to or instead of business rules, to assemble a container or package for use with an application, and simulate the execution of the application using the assembled container. For example, a developer of a financial institution may use the application development system to develop rules, decision charts, and application configuration files for a personal finance processing application. The application may use a particular version of a "checking account" decision chart for processing a customer request for establishing a new checking account, a particular version of an "interest rate" rule for determining the interest rate for the checking account, and a particular version of a "finance configuration" application configuration file for specifying an interface that enables a user to set values or expressions for parameters used by the personal finance processing application.

The techniques described herein can also be applied to charts (e.g., decision charts, executable dataflow graphs), containers, and other types of data structures, as well as a (e.g., a flowchart or an executable dataflow graph) includes multiple nodes with links connecting the nodes. Each node in the chart represents one or more portions of the executable logic, which in turn correspond to one or more portions of a specification. For example, a node includes one or more logical expressions (hereinafter "logic") from which the executable logic is generated. In another example, a node corresponds to one or more particular portions of executable logic, when the executable logic is in a particular state.

In general, the "chart" herein described may be implemented as a dataflow graph and the methods or the processing described herein may be executed by a computing system, the computing system including: a development environment coupled to a data storage, wherein the development environment is configured to build a data processing application that is associated with the data flow graph that implements a graph-based computation performed on data items flowing from one or more input data sets through a graph of processing graph components to one or more output data sets, wherein the data flow graph is specified by data structures in the data storage, the dataflow graph having a plurality of nodes being specified by the data structures and representing the graph components connected by one or more links, the links being specified by the data structures and representing data flows between the graph components; a runtime environment coupled to the data storage and being hosted on one or more computers, the runtime environment including a pre-execution module configured to read the stored data structures specifying the dataflow graph and to allocate and configure computing resources (such as processes) for performing the computation of the graph components that are assigned to the dataflow graph by the pre-execution module, the runtime environment including an execution module to schedule and control execution of the assigned processes such that one or more of the below described operations according to the method or the processing are executed.

In this example, a dataflow graph is a computer program executed within a dataflow graph execution environment that processes data from one or more data sources. The data from the data sources are manipulated and processed according to the dataflow graph and exported to one or more data sinks. Data sources and sinks can include files, databases, data streams, or queues, for example. Dataflow graphs are represented as directed graphs including nodes representing data processing components each including code for processing data from at least one data input and providing data to at least one data output, and nodes representing dataset objects for accessing the data sources and/or sinks. The nodes are connected by directed links representing flows of data between the components, originating at the data sources and terminating at the data sinks. The data output ports of upstream components are connected to the data input ports of downstream components. The dataflow graphs may be reused for different data sources and different data sinks represented by the dataset objects. The data structures and program code used to implement dataflow graphs can support multiple different configurations by being parameterized to enable different sources and sinks to be substituted readily, for example. Furthermore, in some arrangements, the flow of the dataflow graph may be altered by the use of parameters, such that a component or a series of components may be bypassed. In general, a parameter represents a property of a dataflow graph that can be configured or changed. For example, a property can be changed between uses of the dataflow graph, and the dataflow graph may perform operations differently as a result of the change.

The construction of a dataflow graph can be highly technical in nature in some cases. The data flow graph may implement a graph-based computation performed on data flowing from one or more input data sets through a graph of processing graph components to one or more output data sets, wherein the data flow graph is specified by data structures in a data storage, the dataflow graph having a plurality of nodes being specified by the data structures and representing the graph components connected by one or more links, the links being specified by the data structures and representing data flows between the graph components. A runtime environment coupled to the data storage and being hosted on one or more computers may be used, the runtime environment including a pre-execution module configured to read the stored data structures specifying the data flow graph and to allocate and configure computing resources such as processes for performing the computation of the graph components that are assigned to the data flow graph by the pre-execution module, the runtime environment including an execution module to schedule and control execution of the assigned processes such that any one of the methods described herein is executed.

While written to achieve specific business ends, the underlying structure and construction of the graph is determined based upon technical considerations. For example, graph components may be selected to maximize reusability, or to support parallel processing. On the other hand, how and where a graph is used may be largely a business decision. Some of the parameters associated with a parameterized dataflow graph can be used to enable business users to customize dataflow graphs without requiring the user to understand the technical complexities behind its implementation. The parameterized dataflow graphs simplify customization and facilitate reuse.

An interface for identification of parameter values for constructing a dataflow graph can be presented on a client machine. In some implementations, the client may be accessing a development environment running on a server using a web browser on the client that provides the parameter interface, and using a scripting language which provides some capability for client side processing. The scripting language may communicate with the server to update parameters and perform other necessary operations. This communication may occur via a bridge machine which translates the communications between the client and the server running a development environment storing objects and associated parameter values for the graphs being constructed.

The interface allows a user to configure the parameters of a parameterized dataflow graph even if the user lacks technical knowledge relating to dataflow graphs and dataflow graph configuration. Generally, the system stores this configuration of parameters and/or associated values of a parameterized dataflow graph in a file, referred to herein as an application configuration file.

With regard to containers, in some examples the container includes rules, decision charts, and application configuration files. In this example, the editor application is linked to the simulator application. A user associates a container of rules with a credit card processing application. The editor application provides an option for the user to invoke the simulator application to simulate execution of the credit card processing application. In some implementations, the application is a graph-based computation having data processing components connected by linking elements representing data flows. The simulator application converts the rules in the container into a transform, associates the transform with a component in the graph-based computation, executes the graph-based computation, and displays the output results of the execution, while logging the results in a shared log record.

As described herein, the integrated application development system of FIGS. 1-11 provides several improvements. For example, when the different applications in the system store files to non-volatile storage devices, the different client portals can store the files to different local file directories associated with the client portals. Thus, for example, in system, if the editor application is executed on a first computer "Comp_1," the editor application can save working documents to a local file directory, such as "Comp_1\usr\doc_editor\working file\". In system, if the process management application is executed on a second computer "Comp_2," the process management application can save working documents to a local file directory, such as "Comp_2\usr\bpm\working_file\". In the system, if the version control client portal is executed on a third computer "Comp_3," the version control client portal can save working documents to a local file directory, such as "Comp_3\usr\source_code_control\working_file\". In the system, if the simulator application 2618 is executed on a fourth computer "Comp_4," the simulator application can save working documents to a local file directory, such as "Comp_4\usr\app_sim\working_file\".

In system, the editor application may not know where the working files of the process management application, the version control application, and the simulator application are stored. Similarly, in system, the simulator application may not know where the working files of the editor application, the process management application, and the version control client portal are stored. Thus, in the system, the user needs to spend time and computing resources to navigate among different working file directories in order to access the needed files. In the system, the user may have to spend effort setting up correct file paths in order for the different client portals to know the locations of the working file directories of the other client portals.

By comparison, the system has an integrated user interface that allows the user to conveniently access the working files of the various client portals when processing the rules without the need to remember the details of the working file directories of the various client portals.

For example, the application development system can have other advantages. For example, the application development system has reduced memory requirements because the applications access the same data stored in memory, reducing the need to duplicate data, which may be needed in the system. Each of the editor application, process management application, simulator application, and version control client portal stores copies of files and data locally. The system has a common log data object that can be accessed by the client portals, such that information entered into the common log data object by one of the client portals can be accessed by another one of the client portals. By reviewing the common log data object, the user can determine, e.g., who accessed, edited, approved, and/or simulated a particular version of a particular rule container or ruleset, and when those events happened. This is more efficient than the system in which each client portal writes to its own log file. In system, the user has to access multiple log files in order to obtain information about who accessed, edited, approved, and/or simulated a particular version of a rule container or ruleset, and when those events happened.

The system can have an advantage in which the integrated user interface enables the user to access functions of two or more of the client portals and the outputs of two or more of the client portals can be provided to the user, e.g., shown side by side. Changes made to data processed by one of the client portals can automatically trigger the update of outputs generated by another one of the client portals.

For example, the user can select a test input file and an application program using the application simulation interface. The user can edit a rule using the editor interface. In some implementations, as the user modifies the rule, the application development system automatically invokes the simulator application to convert the rule cases of the rule to a plurality of logical expressions, compile the plurality of logical expressions into computer-executable code, incorporate the computer-executable code into the selected application program, and execute the selected application program to use the rule to process the test input records and generate output data. The application simulation interface shows the output data to the user. This provides quick feedback to the user, allowing the user to properly and efficiently operate the underlying computing system and to quickly and efficiently try several parameter values for the rule cases to find optimal values. In some implementations, the simulator application is configured to wait for an explicit instruction from the user before executing the application program.

An advantage of the application development system is that it provides an integrated user interface that allows the user to edit rules, manage development lifecycles and versioning of the rules, and perform simulations of applications using the rules in a unified manner. Tags and other information associated with the rules are accessible to the various applications in the system. For example, when the user uses the editor application to select particular rules and particular versions of the rules for a container, the information about the selected rules can be provided to the simulator application, which loads the selected versions of the rules and generate transforms based on those rules.

For example, the simulation output dataset generated by the simulator application can be provided to the editor application which can display the rules alongside the output dataset. The editor application may provide an interface that allows the user to select one or more values in the output dataset, and the interface may highlight the portions of the rules that were triggered to generate the selected output value(s). If the output value(s) are different from intended, the user can review the highlighted portions of the rules to determine if they need further revisions. The user can modify the rules, run the simulation again, and see if the updated output values are the same as intended, and further revise the rules as necessary.

The application development system allows a business person who may not have special expertise in computer programming to be able to edit rules, execute application programs using the rules, determine if the outputs are the same as intended, and further edit the rules as necessary. For example, a financial analyst working at a credit card company may have expertise in finance but may not know how to write computer code to implement rules for processing credit card applications, rules for determines credit card rewards, and rules for detecting fraudulent credit card transactions. Using the application development system, the financial analyst can revise values and formulas in a spreadsheet (which many financial analysts are familiar with), and the rules specified based on those values and formulas can be transformed into code that are inserted into an application program by the simulator application for execution.

In some implementations, the application development system facilitates processes for developing business rules used in marketing or business campaigns. Different companies may have different processes and different numbers of team members who work together to develop business rules. For example, one company may use a single maker and a single checker to write and review the business rules and evaluate the risks. For example, another company may have three or more checkers to provide additional levels of review.

In some implementations, the application development system enables users to efficiently and conveniently develop rules for facilitating various applications. For example, the processes described herein may be industrial processed happening in a factory, where data is created, transformed and stored for use by industrial machines. In another example, a financial institution (e.g., a bank, credit card company, or investment firm) may have a campaign that offers new products or promotions to customers or potential customers. In a first product offering, the financial institution may offer a new home equity loan to qualified customers. In a second product offering, the financial institution may offer new credit cards having various rewards programs. The offers of these campaign products may appear in advertisements shown on ATM machines, advertisements sent by e-mail or text messages, advertisements presented on web sites, or advertisements sent by postal mail. For different customers, the details of the offers may be different.

For example, when a customer accesses an on-line account at the financial institution using a web browser, the customer may be greeted with a welcome web page showing the various services offered by the financial institution. The web page may also display one or more promotional offers tailored toward the customer. The web page may be generated by a computer server of the financial institution. When the customer logs into the on-line account, the computer server at the financial institution determines what promotions to offer to the customer based on, e.g., financial and other information associated with the customer.

For example, if the customer has a home mortgage, the computer server may determine that the customer may be interested in a home equity loan. When the computer server generates the web page to be shown to the customer, a promotional offer from the first campaign product may be inserted into the web page. For example, the offer may provide a new home equity loan with a low interest rate. For example, if the customer does not have a credit card or has a high credit score, the computer server may determine that the customer may be interested in a new credit card. When the computer server generates the web page to be shown to the customer, a promotional offer from the second campaign product may be inserted into the web page, in which the offer may provide information about a new credit card program that offers generous cash-back rewards.

For a given campaign, different offers may be served to different customers. For example, in the first campaign product, a new home equity loan with a 3.5% interest rate may be offered to a first customer having a high credit score and a large combined savings and checking account, a new home equity loan with a 4% interest rate may be offered to a second customer having a high credit score and a small combined savings and checking account, and a new home equity loan with a 4.5% interest rate may be offered to a third customer having a medium credit score.

In the second campaign product, a first type of credit card with an annual fee and slightly higher rewards may be offered to a fourth customer having a high income level, a second type of credit card with no annual fee and slightly lower rewards may be offered to a fifth customer having a medium income level, and a third type of credit card having higher reward points on dining and travel may be offered to a sixth customer who already has a travel credit card with lower reward points. The first and second campaign products may not give any promotional offers to customers who have very low credit scores or are a few months behind in credit card payments.

The financial institution may have hundreds of thousands or millions of customers, so it is useful to partially automate the process of determining what promotions to offer to which customers. In some implementations, business rules similar to those described in U.S. Pat. Nos. 8,069,129, 8,386,408, 8,380,651, 9,002,770, and 9,589,232 can be used to partially automate the process of evaluating the financial and other data of the customers and determining what promotional offers to provide to the customers. For example, a set of business rules may be authored, such that the rules can be applied to the records of the customers containing financial data to generate outputs including information about which promotional offers are presented to which customers. The business rules may be incorporated into a graph-based application in the graphic development environment, and the parallel operating environment may generate executable instructions (e.g., computer instructions) that correspond to the logic and resources defined by the graph that incorporates the business rules.

Each campaign may run for a number of days, weeks, or months. The financial institution may launch a new campaigns every couple of days, weeks, or months. Before each new campaign is launched, the staff members of the financial institution may modify the business rules according to the new criteria set by the campaign. In some examples, to ensure the quality of the campaign, three groups of staff members may work on modifying and verifying the business rules. For example, the first group of staff members, which will be referred to as the "Makers," are responsible for activities such as joining data, generating data sets, performing analyses, authoring business rules, running simulations, and profiling data.

For example, the second group of staff members, which will be referred to as the "Checkers," are responsible for activities such as validating that the activities performed by the Makers are consistent with process requirements and corporate policies. For example, the Checkers verify that the campaign or risk objectives are clearly identified and documented, validate the business rules individually and in the aggregate, run the simulations and review the logs for the simulations to confirm the results are consistent with objectives and policies, complete checkpoints, and approve the business rules.

For example, the third group of staff members, which will be referred to as the "Managers," are responsible for reviewing the checkers' comments and recommendations, review audit trails for the generation of the business rules by the Makers and the validation of the business rules by the Checkers, assess the adequacy of controls and validations, and approve or reject progression to the next step in the overall process.

For any given campaign, there may be more than one Maker, more than one Checker, and more than one Manager involved in the authoring, checking, and reviewing of the business rules. It is useful to keep track of who made what changes to the business rules at what time, and keep records (including, e.g., source codes and notes) of different versions of the business rules as the rules are modified over time. Keeping good records not only facilitates debugging and finding sources of errors, it may also help meet certain regulatory requirements.

One of the improvements of the application development system over conventional systems is that the users can access functions provided by the editor application, the business process manage men application, the version control application, and the simulator application through the integrated user interface without the need to switch between different user interfaces, and without the need to manually copy information from one application to the other. Thus, for example, using the system, the user can save the source code for several versions of a business rule using the version control application, and use the process management application to manage the transition of the rules among different states. The version control application keeps track of which user made what changes to a particular piece of code over time. However, the information about states that are generated by the process management application is not automatically carried over to the version control application. Thus, when the source code of the various versions of the business rules is saved, the information about the states generated by the process management application is not saved along with the source code by the version control application. Thus, using the system, it can be difficult for the user to retrieve an earlier version of a business rule and determine the state of the rule, such as whether it was "submitted" or "approved," or to determine who authorized the transition of the rule from one state to another. Using the system, the user may have to compare the logs of the version control application and the process management application to match the notes for a particular version of a particular rule in the process management application with the notes of the same particular version of the particular rule in the version control application, and try to manually deduce the required information based on the notes.

One of the improvements of the application development system is that the application development system can provide functions that cannot be achieved, or would be very difficult to achieve, using the system. For example, an application may evolve over time such that a series of releases of the application are issued over time. Each release of the application may use a package of particular versions of particular rulesets, in which each particular version of the ruleset has a particular state, and the transition to the particular state was approved by a particular user. Different releases of the application may use different packages that includes different versions of the rules. Suppose after several releases of the application have been issued, it is determined that an earlier release of the application did not function properly.

In order to determine the cause of the problem, it may be useful to retrieve the particular versions of the particular rulesets used by the particular release of the application that caused the problem, review the logs of the particular versions of the particular rulesets, and determine what changes were made to the rulesets prior to the occurrence of the problem, who made those changes, who approved those changes, and why those changes were made. It may be useful to review the logs of the overall package of rulesets, and determine what changes were made to the package prior to the occurrence of the problem, who made those changes, who approved those changes, and why those changes were made. It may also be useful to execute a first simulation of the earlier release of the application using the particular versions of the particular rulesets used by the earlier release of the application, execute a second simulation of the application using different versions of the particular rulesets, and/or execute a third simulation of the application by changing some parameters of the rulesets. In the integrated application development system, the metadata stored in the repository have standard formats and can be accessed by all the applications enabling new functions.

After performing each of the first, second, and third simulations described above, it is useful to provide debugging information to the user. For example, when the rule specification includes a spreadsheet having rows corresponding to the rule cases, a user interface can be provided to enable the user to step through each row of the spreadsheet one row at a time and see the values or expressions of the variables or parameters associated with each row. This allows the user to determine whether the variables or parameters have been evaluated correctly at each row. One of the improvements of the application development system is that outputs of applying business rules to input records can be automatically updated and displayed after the business rules are edited by the document editor.

The techniques described above with regard to rulesets are also application to other data structures, including, e.g., rules. Additionally, the techniques described above can be implemented using software for execution on a computer. For instance, the software forms procedures in one or more computer programs that execute on one or more computer programmed or computer programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger computer program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments have been described. Nevertheless, it will be understood that various modifications may be made without departing from the spirit and scope of the techniques described herein. For example, some of the steps described above may be order independent, and thus can be performed in an order different from that described. Additionally, any of the foregoing techniques described with regard to a dataflow graph can also be implemented and executed with regard to a program. Any of the foregoing techniques described with regard to a rule can also be implemented and executed with regard to a ruleset.

It is to be understood that the foregoing description is intended to illustrate and not to limit the scope of the techniques described herein, which is defined by the scope of the appended claims. For example, a number of the function steps described above may be performed in a different order without substantially affecting overall processing. Other embodiments are within the scope of the following claims Other embodiments are within the scope of the following claims.

What is claimed is:

1. A computer-implemented method for implementing one or more rules for use with an application that includes a process portion, a version control portion, and an editor portion in a data processing system, the method including:
    storing multiple versions of a rule in a system storage, in which the rule includes one or more rule cases that specify one or more values for the rule's output depending on the rule's input, and each rule case includes one or more input relationships in which the rule case is triggered by a given input record if one or more data values of the given input record meet the one or more input relationships;
    wherein each version of the rule is configured to be associated with a plurality of states including a first state and a second, different state of the plurality of states;
    storing one or more records that are each shared by the process portion, the version control portion, and the editor portion;
    receiving instructions through a user interface that integrates, through the shared one or more records, the process portion, the version control portion, and the editor portion, with the process portion being presented in a first user interface portion, the version control portion being presented in a second user interface portion, and the editor portion being presented in a third user interface portion;
    wherein the third user interface portion displays one or more tables with rows and columns, wherein the one or more tables represent a particular version of the rule and one or more of the rows represent a particular rule case;
    in response to the receiving of the instructions, executing the received instructions, the executing of the received instructions including:
        selecting, by the version control portion of the application, the particular version of the rule from the multiple versions of the rule stored in the system storage;
        modifying, through the editor portion of the application, the particular version of the rule;
        updating, at least one of the one or more stored records, with data specifying that the particular version of the rule is modified; and
        based on the updating, transitioning, by the process portion of the application, the particular version of the rule from the first state of the plurality of states to the second, different state of the plurality of states; and
    storing, in one of the one or more records shared by the version control portion of the application, the process portion of application, and the editor portion, information resulting from the executing of the instructions received through the user interface that integrates the version control, editor and process portions.

2. The method of claim 1, wherein the one or more shared records are linked to the multiple versions of the rule.

3. The method of claim 1, wherein the third user interface portion of the integrated user interface displays plural entries representing a given rule that is associated with a given state of the rule and a given version of the rule, and wherein the process portion of the application is for submitting data specifying a state transition of the given rule, and the version control portion of the application is for specifying a new version of the given rule.

4. The method of claim 3, further including:
    modifying a given one of the plural entries through the editor portion being presented in the third user interface portion of the integrated user interface;
    generating a new rule based on the modified given entry;
    saving by the data processing system the new rule as a new version of the given rule; and
    automatically updating, by the data processing system, a given record of the one or more shared records with data specifying the new version of the given rule generated and an initial state of the new version of the given rule.

5. The method of claim 3, wherein the plural entries are rows that are rendered in the third user interface portion of the integrated user interface, and with each of the rows including cells, of which one or more cells are modified through a further user interface portion of the integrated user interface, and the version control portion is for specifying the new version of the given rule.

6. The method of claim 5, further including:
    automatically updating by the data processing system a given record of the one or more shared records, with data specifying the new version of the given rule generated and an initial state of the new version of the given rule, based on actions performed through at least two of the first user interface portion, the second user interface portion, and the third user interface portion of the integrated user interface.

7. The method of claim 1, wherein the instructions are first instructions, and the method further includes receiving, through the integrated user interface, second instructions and in response to the receiving of the second instructions, executing the received second instructions, the executing of the received second instructions including:
    selecting a group of two or more rules from a plurality of rules stored in the system storage, each rule in the group being a particular version of a plurality of versions of the rules;
    associating the group of selected rules with a release tag; and
    transitioning the release tag from a first state of a plurality of states to a second state of the plurality of states.

8. The method of claim 1, wherein the information resulting from the executing of the instructions includes log information that represents the selecting performed by the version control portion of the application responsive to the received instructions and the transitioning performed by the process portion of the application responsive to the received instructions.

9. The method of claim 1, wherein the information resulting from the executing of the instructions includes the rule with the selected particular version and with the second state of the plurality of states.

10. The method of claim 1, wherein the process portion of the application is distinct from the version control portion of the application, and wherein the process portion of the application and the version control portion of the application are not configured to transmit data to each other and to receive data from each other.

11. The method of claim 1, wherein the process portion of the application is executed on a first server computer and the version control portion of the application is executed on a second server computer.

12. The method of claim 1, wherein the received instructions include one or more state instructions received through the process portion of the application presented in the first user interface portion and one or more version instructions received through the version control portion of the application presented in the second interface portion, and wherein:
the selecting, by the version control portion of the application, of the particular version of the rule from the multiple versions of the rule stored in the system storage is performed in response to the receiving of the one or more version instructions specifying the particular version; and
the transitioning, by the process portion of the application, of the particular version of the rule from the first state of the plurality of states to the second, different state of the plurality of states is performed in response to the receiving of the one or more state instructions specifying the state transition.

13. The method of claim 4, further including receiving a user-initiated selection of simulator portion of the application being presented in a fourth user interface portion of the integrated user interface;
in response to receiving the selection of the simulation portion of the application:
causing, by the simulator portion of the application being accessed by the version control portion of the application, the new rule represented by the entries to execute against a given input data record to perform a simulation of the execution of the new version of the given rule; and
automatically updating, by the data processing system, a given record of the one or more shared records with information resulting from the simulation.

14. The method of claim 13, wherein the fourth user interface portion provides visualizations indicative of the simulation currently being performed.

15. The method of claim 14, wherein the visualizations includes input visualizations that indicate input data of the given input data record on which the new rule is executing during the simulation.

16. The method of claim 14, wherein the visualizations include visualizations indicating which rule case of the new rule has been triggered during the simulation.

17. The method of claim 14, wherein the visualizations include output visualizations indicating output data that results from the execution of the new rule against the given input data record during the simulation.

18. The method of claim 13, wherein the information resulting from the simulation includes data specifying that instructions were received to perform the simulation on the new version of the given rule.

19. The method of claim 13, wherein the information resulting from the simulation includes data that is indicative of the results of the simulation.

20. The method of claim 14, wherein the visualizations provided by the fourth user interface portion are indicative of the progress of the execution of the new rule in real-time.

21. The method of claim 1, wherein the plurality of states are a plurality of states of a development lifecycle or an approval process of the rule.

22. The method of claim 1, further including:
executing, through the integrated user interface, the particular version of the rule in the second, different state by:
receiving, from the version control portion of the application or the process portion of the application, the particular version of the rule;
generating a transform for transforming data based on the particular version of the rule in the second, different state;
providing a data processing component including the transform to a dataflow graph; and
executing the dataflow graph including using the data processing component to apply the transform to data inputted to the dataflow graph.

23. The method claim 1, wherein:
storing includes storing multiple versions of a ruleset in a system storage, in which the ruleset includes one or more rules, each rule including one or more rule cases that specify one or more values for the rule's output depending on the rule's input, and each rule case includes one or more input relationships in which the rule case is triggered by a given input record if one or more data values of the given input record meet the one or more input relationships;
selecting includes selecting, by the version control portion of the application, a particular version of the ruleset from the multiple versions of the ruleset stored in the system storage; and
transitioning includes transitioning, by the process portion of the application, the particular version of the ruleset from the first state of the plurality of states to the second, different state of the plurality of states.

24. One or more machine-readable hardware storage devices for implementing one or more rules for use with an application that includes a process portion, a version control portion, and an editor portion in a data processing system, the one or more machine-readable hardware storage devices storing instructions that are executable by one or more processors to perform operations including:
storing multiple versions of a rule in a system storage, in which the rule includes one or more rule cases that specify one or more values for the rule's output depending on the rule's input, and each rule case includes one or more input relationships in which the rule case is triggered by a given input record if one or more data values of the given input record meet the one or more input relationships;
wherein each version of the rule is configured to be associated with a plurality of states including a first state and a second, different state of the plurality of states;
storing one or more records that are each shared by the process portion, the version control portion, and the editor portion;
receiving instructions through a user interface that integrates, through the shared one or more records, the process portion, the version control portion, and the editor portion, with the process portion being presented in a first user interface portion, the version control portion being presented in a second user interface portion, and the editor portion being presented in a third user interface portion;
wherein the third user interface portion displays one or more tables with rows and columns, wherein the one or more tables represent a particular version of the rule and one or more of the rows represent a particular rule case;

in response to the receiving of the instructions, executing the received instructions, the executing of the received instructions including:

selecting, by the version control portion of the application, the particular version of the rule from the multiple versions of the rule stored in the system storage;

modifying, through the editor portion of the application, the particular version of the rule;

updating, at least one of the one or more stored records, with data specifying that the particular version of the rule is modified; and based on the updating, transitioning, by the process portion of the application, the particular version of the rule from the first state of the plurality of states to the second, different state of the plurality of states; and storing, in one of the one or more records shared by the version control portion of the application, the process portion of application, and the editor portion, information resulting from the executing of the instructions received through the user interface that integrates the version control, editor and process portions.

25. The one or more machine-readable hardware storage devices of claim 24, wherein the one or more shared records are linked to the multiple versions of the rule.

26. The one or more machine-readable hardware storage devices of claim 24, wherein the third user interface portion of the integrated user interface displays plural entries representing a given rule that is associated with a given state of the rule and a given version of the rule, and wherein the process portion of the application is for submitting data specifying a state transition of the given rule, and the version control portion of the application is for specifying a new version of the given rule.

27. The one or more machine-readable hardware storage devices of claim 26, wherein the operations further include:

modifying a given one of the plural entries through the editor portion being presented in the third user interface portion of the integrated user interface;

generating a new rule based on the modified given entry;

saving by the data processing system the new rule as a new version of the given rule; and automatically updating, by the data processing system, a given record of the one or more shared records with data specifying the new version of the given rule generated and an initial state of the new version of the given rule.

28. The one or more machine-readable hardware storage devices of claim 26, wherein the plural entries are the rows that are rendered in the third user interface portion of the integrated user interface, and with each of the rows including cells, of which one or more cells are modified through a further user interface portion of the integrated user interface, and the version control portion is for specifying the new version of the given rule.

29. The one or more machine-readable hardware storage devices of claim 28, wherein the operations further include:

automatically updating by the data processing system a given record of the one or more shared records, with data specifying the new version of the given rule generated and an initial state of the new version of the given rule, based on actions performed through at least two of the first user interface portion, the second user interface portion, and the third user interface portion of the integrated user interface.

30. The one or more machine-readable hardware storage devices of claim 24, wherein the instructions are first instructions, and the operations further include receiving, through the integrated user interface, second instructions and in response to the receiving of the second instructions, executing the received second instructions, the executing of the received second instructions including:

selecting a group of two or more rules from a plurality of rules stored in the system storage, each rule in the group being a particular version of a plurality of versions of the rules;

associating the group of selected rules with a release tag; and transitioning the release tag from a first state of a plurality of states to a second state of the plurality of states.

31. The one or more machine-readable hardware storage devices of claim 24, wherein the information resulting from the executing of the instructions includes log information that represents the selecting performed by the version control portion of the application responsive to the received instructions and the transitioning performed by the process portion of the application responsive to the received instructions.

32. A data processing system for use with an application that includes a process portion, a version control portion, and an editor portion in the data processing system, the data processing system including:

one or more processors; and one or more machine-readable hardware storage devices storing instructions that are executable by the one or more processors to perform operations including:

storing multiple versions of a rule in a system storage, in which the rule includes one or more rule cases that specify one or more values for the rule's output depending on the rule's input, and each rule case includes one or more input relationships in which the rule case is triggered by a given input record if one or more data values of the given input record meet the one or more input relationships;

wherein each version of the rule is configured to be associated with a plurality of states including a first state and a second, different state of the plurality of states;

storing one or more records that are each shared by the process portion, the version control portion, and the editor portion;

receiving instructions through a user interface that integrates, through the shared one or more records, the process portion, the version control portion, and the editor portion, with the process portion being presented in a first user interface portion, the version control portion being presented in a second user interface portion, and the editor portion being presented in a third user interface portion;

wherein the third user interface portion displays one or more tables with rows and columns, wherein the one or more tables represent a particular version of the rule and one or more of the rows represent a particular rule case;

in response to the receiving of the instructions, executing the received instructions, the executing of the received instructions including:

selecting, by the version control portion of the application, the particular version of the rule from the multiple versions of the rule stored in the system storage;

modifying, through the editor portion of the application, the particular version of the rule;

updating, at least one of the one or more stored records, with data specifying that the particular version of the rule is modified; and based on the updating, transitioning, by the process portion of the application, the particular version of the rule from the first state of the plurality of states to the second, different state of the plurality of states; and storing, in one of the one or more records shared by the version control portion of the application, the process portion of application, and the editor portion, information resulting from the executing of the instructions received through the user interface that integrates the version control, editor and process portions.

33. The data processing system of claim 32, wherein the one or more shared records are linked to the multiple versions of the rule.

34. The data processing system of claim 32, wherein the third user interface portion of the integrated user interface displays plural entries representing a given rule that is associated with a given state of the rule and a given version of the rule, and wherein the process portion of the application is for submitting data specifying a state transition of the given rule, and the version control portion of the application is for specifying a new version of the given rule.

35. The data processing system of claim 34, wherein the operations further include:

modifying a given one of the plural entries through the editor portion being presented in the third user interface portion of the integrated user interface;

generating a new rule based on the modified given entry;

saving by the data processing system the new rule as a new version of the given rule; and automatically updating, by the data processing system, a given record of the one or more shared records with data specifying the new version of the given rule generated and an initial state of the new version of the given rule.

36. The data processing system of claim 34, wherein the plural entries are the rows that are rendered in the third user interface portion of the integrated user interface, and with each of the rows including cells, of which one or more cells are modified through a further user interface portion of the integrated user interface, and the version control portion is for specifying the new version of the given rule.

37. The data processing system of claim 36, wherein the operations further include:

automatically updating by the data processing system a given record of the one or more shared records, with data specifying the new version of the given rule generated and an initial state of the new version of the given rule, based on actions performed through at least two of the first user interface portion, the second user interface portion, and the third user interface portion of the integrated user interface.

38. The one or more machine-readable hardware storage devices of claim 32, wherein the instructions are first instructions, and the operations further include receiving, through the integrated user interface, second instructions and in response to the receiving of the second instructions, executing the received second instructions, the executing of the received second instructions including:

selecting a group of two or more rules from a plurality of rules stored in the system storage, each rule in the group being a particular version of a plurality of versions of the rules;

associating the group of selected rules with a release tag; and transitioning the release tag from a first state of a plurality of states to a second state of the plurality of states.

39. The one or more machine-readable hardware storage devices of claim 32, wherein the information resulting from the executing of the instructions includes log information that represents the selecting performed by the version control portion of the application responsive to the received instructions and the transitioning performed by the process portion of the application responsive to the received instructions.

* * * * *

UNITED STATES PATENT AND TRADEMARK OFFICE
CERTIFICATE OF CORRECTION

PATENT NO. : 10,782,960 B2  
APPLICATION NO. : 15/917182  
DATED : September 22, 2020  
INVENTOR(S) : Scott Studer, Joel Gould and Amit Weisman It is certified that error appears in the above-identified patent and that said Letters Patent is hereby corrected as shown below:

In the Specification

Column 1, Line 11, after "application", insert -- no. --

In the Claims

Column 30, Line 24, Claim 5, after "are", insert -- the --

Column 32, Line 17 (approx.), Claim 23, after "method", insert -- of --

Column 36, Lines 20-21, Claim 38, delete "one or more machine-readable hardware storage devices" and insert -- data processing system --

Column 36, Lines 35-36, Claim 39, delete "one or more machine-readable hardware storage devices" and insert -- data processing system --

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*